US012603334B2

(12) United States Patent     (10) Patent No.:    US 12,603,334 B2

Zhou et al.                (45) Date of Patent:      Apr. 14, 2026

---

(54) BATTERY TESTING APPARATUS AND METHOD, PRODUCTION METHOD, DEVICE, AND MEDIUM

(71) Applicant: CONTEMPORARY AMPEREX TECHNOLOGY CO., LIMITED, Ningde (CN)

(72) Inventors: Xiaofeng Zhou, Ningde (CN); Jianlin Liu, Ningde (CN); Zhimeng Shi, Ningde (CN); Fenglin Zhang, Ningde (CN)

(73) Assignee: CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 0 days.

(21) Appl. No.: 19/304,718

(22) Filed: Aug. 20, 2025

(65) Prior Publication Data

US 2025/0391936 A1     Dec. 25, 2025

Related U.S. Application Data

(63) Continuation of application No. PCT/CN2023/140369, filed on Dec. 20, 2023.

(30) Foreign Application Priority Data

Jun. 30, 2023    (CN) ........................ 202310797532.1

(51) Int. Cl.
*H01M 10/42*      (2006.01)
*G06T 7/00*       (2017.01)
*H01M 10/04*      (2006.01)

(52) U.S. Cl.
CPC ....... *H01M 10/4285* (2013.01); *G06T 7/0004* (2013.01); *H01M 10/0413* (2013.01);
(Continued)

(58) Field of Classification Search
CPC ......... H01M 10/0413; H01M 10/4285; H01M 2220/20; G06T 7/0004; G06T 2207/10116;
(Continued)

(56) References Cited

U.S. PATENT DOCUMENTS

| | | | | |
|---|---|---|---|---|
| 2025/0172509 A1* | 5/2025 | Kim | ........................... | G06T 7/11 |
| 2025/0189465 A1* | 6/2025 | Kim | ........................... | G06T 7/13 |

FOREIGN PATENT DOCUMENTS

| | | |
|---|---|---|
| CN | 101997135 A | 3/2011 |
| CN | 108387594 A | 8/2018 |

(Continued)

OTHER PUBLICATIONS

Machine translation of KR 2020-0088222 A, cited in the IDS filed Aug. 20, 2025. (Year: 2020).*

(Continued)

*Primary Examiner* — Thomas R Artman
(74) *Attorney, Agent, or Firm* — Ladas & Parry, LLP

(57)          ABSTRACT

A testing apparatus and method for testing a battery, a device, and a medium are disclosed. The testing apparatus includes a first ray source, a first detector, a second ray source, a second detector, a bearing platform, and a testing unit. The bearing platform is configured to place a battery to be tested, and the bearing platform is movable. A movement trajectory of the bearing platform passes between the first ray source and the first detector, and the movement trajectory of the bearing platform passes between the second ray source and the second detector. The testing unit is respectively connected to the first detector and the second detector. The testing unit is configured to perform defect testing on the battery to be tested based on a ray received by the first detector and a ray received by the second detector.

18 Claims, 14 Drawing Sheets

(52) U.S. Cl.
CPC .............. *G06T 2207/10116* (2013.01); *H01M*
*2220/20* (2013.01)

(58) Field of Classification Search
CPC ...... G01N 23/04; G01N 23/083; G01N 23/18;
G01N 2223/1016; G01N 2223/204; G01N
2223/3307; G01N 2223/3308; G01N
2223/401; G01N 2223/643; G01N
2223/646
See application file for complete search history.

(56)                     References Cited

FOREIGN PATENT DOCUMENTS

| CN | 113924675 | A |   | 1/2022 | |
| CN | 215727795 | U | * | 2/2022 | |
| CN | 218272049 | U |   | 1/2023 | |
| CN | 117705836 | A | * | 3/2024 | ............. G01N 23/18 |
| CN | 119438254 | A | * | 2/2025 | ............. G01N 23/04 |
| KR | 20200088222 | A |   | 7/2020 | |
| KR | 20210009271 | A | * | 1/2021 | ............. G01N 23/04 |
| KR | 20210015180 | A | * | 2/2021 | ........ H01M 10/0436 |
| KR | 20110014947 | A |   | 2/2022 | |
| KR | 20220086871 | A |   | 6/2022 | |
| KR | 20230095557 | A |   | 6/2023 | |
| WO | 2020/250609 | A1 |   | 12/2020 | |

OTHER PUBLICATIONS

Machine translation of KR 2011-0014947 A, cited in the IDS filed
Aug. 20, 2025. (Year: 2011).*
ISR for PCT/CN2023/140369 mailed Mar. 1, 2024.

* cited by examiner

| | |
|---|---|
| Obtain a testing image of a battery to be tested | S101 |
| Determine defect information of the battery to be tested based on the testing image | S102 |
| Determine a quality testing result of the battery to be tested based on the defect information of the battery to be tested | S103 |

S101

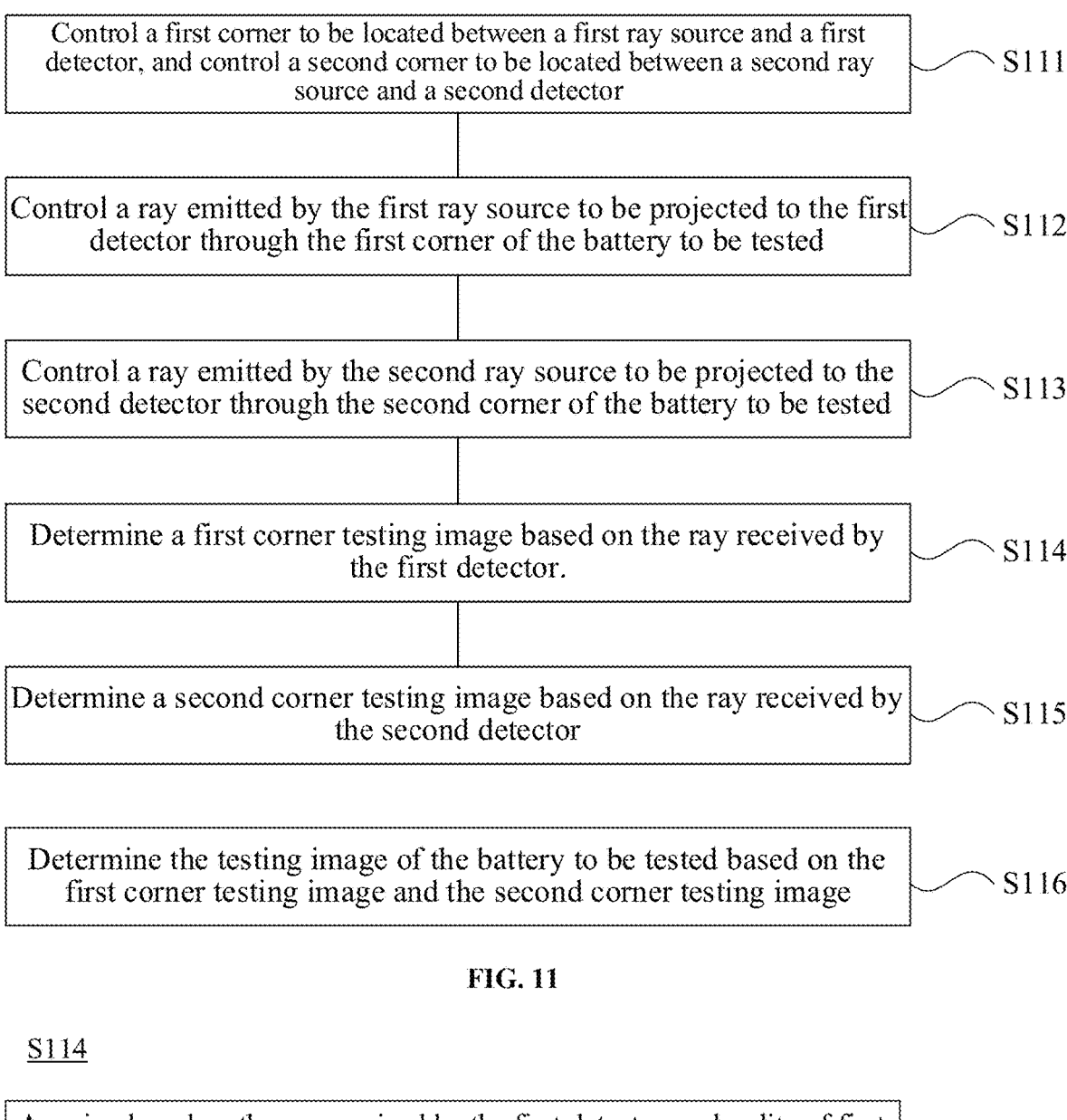

Control a first corner to be located between a first ray source and a first detector, and control a second corner to be located between a second ray source and a second detector ⟩S111

Control a ray emitted by the first ray source to be projected to the first detector through the first corner of the battery to be tested ⟩S112

Control a ray emitted by the second ray source to be projected to the second detector through the second corner of the battery to be tested ⟩S113

Determine a first corner testing image based on the ray received by the first detector. ⟩S114

Determine a second corner testing image based on the ray received by the second detector ⟩S115

Determine the testing image of the battery to be tested based on the first corner testing image and the second corner testing image ⟩S116

Acquire, based on the ray received by the first detector, a plurality of first original images that include the first corner ⟩S1141

Process the plurality of first original images to obtain the first corner testing image ⟩S1142

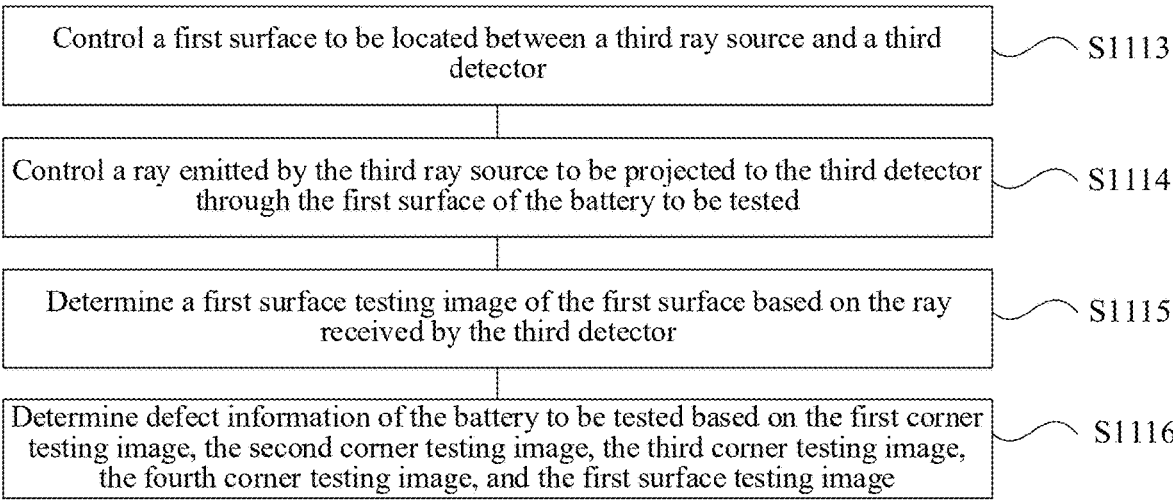

| Control a first surface to be located between a third ray source and a third detector | S1113 |
| Control a ray emitted by the third ray source to be projected to the third detector through the first surface of the battery to be tested | S1114 |
| Determine a first surface testing image of the first surface based on the ray received by the third detector | S1115 |
| Determine defect information of the battery to be tested based on the first corner testing image, the second corner testing image, the third corner testing image, the fourth corner testing image, and the first surface testing image | S1116 |

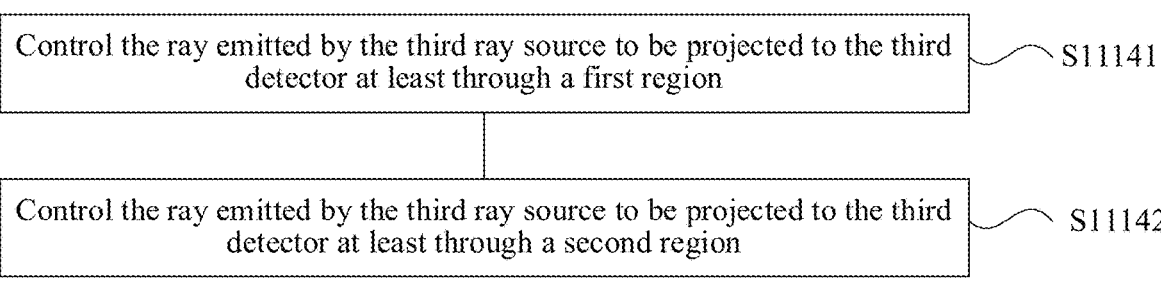

| Control the ray emitted by the third ray source to be projected to the third detector at least through a first region | S11141 |
| Control the ray emitted by the third ray source to be projected to the third detector at least through a second region | S11142 |

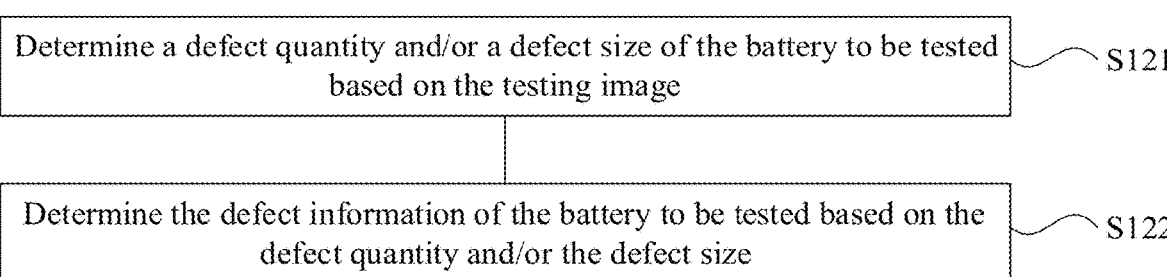

| Determine a defect quantity and/or a defect size of the battery to be tested based on the testing image | S121 |
| Determine the defect information of the battery to be tested based on the defect quantity and/or the defect size | S122 |

FIG. 17

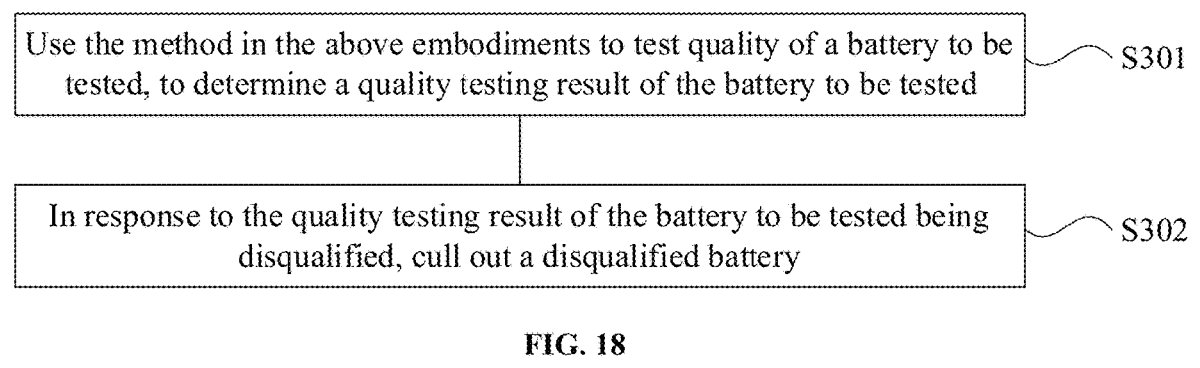

Use the method in the above embodiments to test quality of a battery to be tested, to determine a quality testing result of the battery to be tested    S301

In response to the quality testing result of the battery to be tested being disqualified, cull out a disqualified battery    S302

FIG. 18

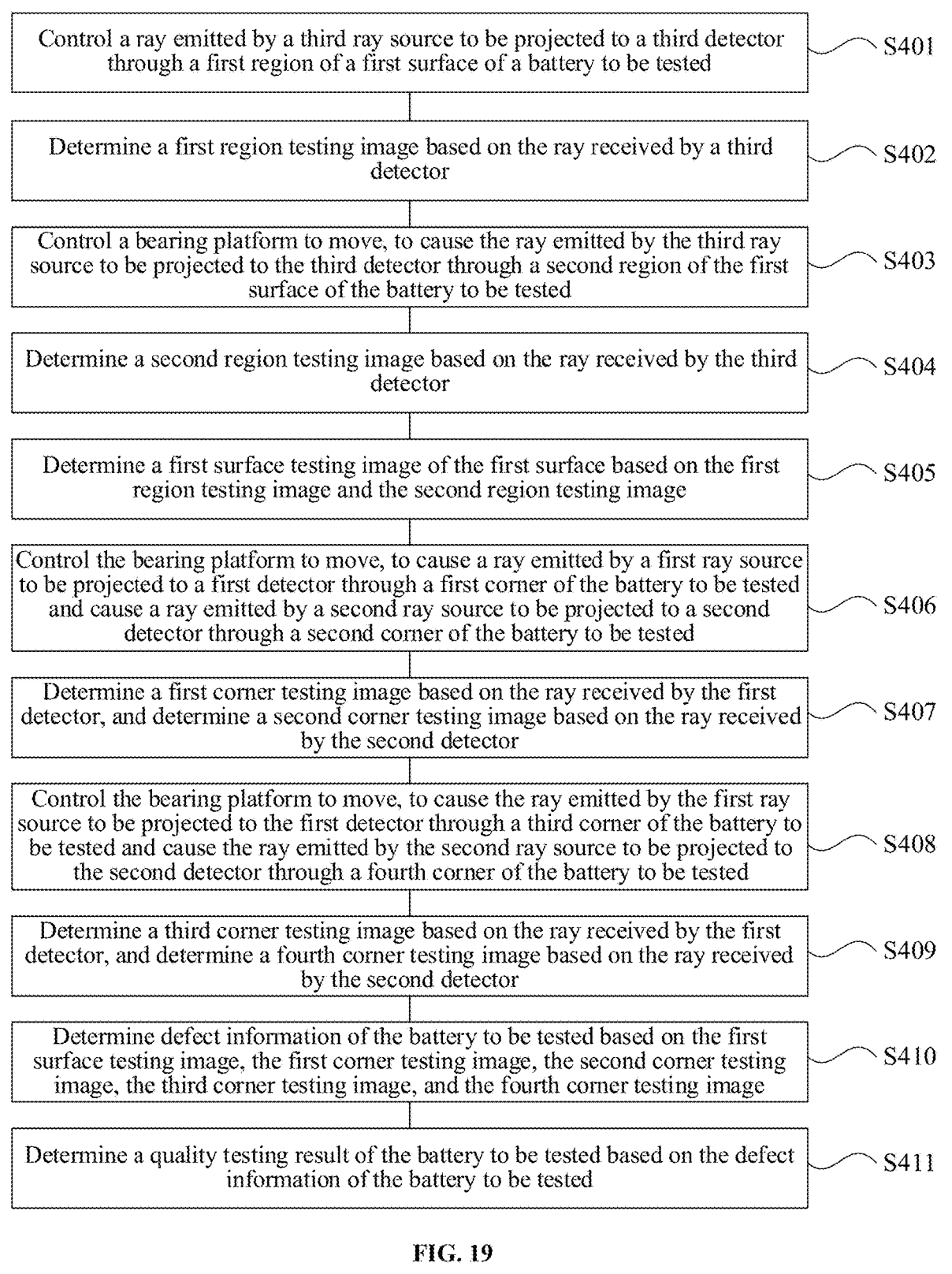

| | |
|---|---|
| Control a ray emitted by a third ray source to be projected to a third detector through a first region of a first surface of a battery to be tested | S401 |
| Determine a first region testing image based on the ray received by a third detector | S402 |
| Control a bearing platform to move, to cause the ray emitted by the third ray source to be projected to the third detector through a second region of the first surface of the battery to be tested | S403 |
| Determine a second region testing image based on the ray received by the third detector | S404 |
| Determine a first surface testing image of the first surface based on the first region testing image and the second region testing image | S405 |
| Control the bearing platform to move, to cause a ray emitted by a first ray source to be projected to a first detector through a first corner of the battery to be tested and cause a ray emitted by a second ray source to be projected to a second detector through a second corner of the battery to be tested | S406 |
| Determine a first corner testing image based on the ray received by the first detector, and determine a second corner testing image based on the ray received by the second detector | S407 |
| Control the bearing platform to move, to cause the ray emitted by the first ray source to be projected to the first detector through a third corner of the battery to be tested and cause the ray emitted by the second ray source to be projected to the second detector through a fourth corner of the battery to be tested | S408 |
| Determine a third corner testing image based on the ray received by the first detector, and determine a fourth corner testing image based on the ray received by the second detector | S409 |
| Determine defect information of the battery to be tested based on the first surface testing image, the first corner testing image, the second corner testing image, the third corner testing image, and the fourth corner testing image | S410 |
| Determine a quality testing result of the battery to be tested based on the defect information of the battery to be tested | S411 |

FIG. 19

BATTERY TESTING APPARATUS AND METHOD, PRODUCTION METHOD, DEVICE, AND MEDIUM

CROSS-REFERENCE

The present application is a continuation of International application PCT/CN2023/140369 filed on Dec. 20, 2023 that claims priority to Chinese patent application No. 202310797532.1, filed on Jun. 30, 2023. The content of these application is incorporated into this application by reference in its entirety.

TECHNICAL FIELD

The present application relates to the technical field of batteries, and in particular, to a battery testing apparatus and method, a battery production method and device, and a medium.

BACKGROUND

With energy saving and emission reduction being the key to the sustainable development of the automobile industry, electric vehicles have become an important part of the sustainable development of automotive industry due to their advantages of energy saving and environmental protection. For electric vehicles, a battery technology is an important factor in development.

Batteries may have defects during production or during use. For a stacked battery, four corners of the battery are easily bumped to have defects. Some defects may not be observed from the appearance of the battery, so that the inside of the battery needs to be tested.

In the related art, during the testing of the battery, an image of the corners of the battery easily gets distorted, so that there are misjudgment, omissions, and incompletion of the defect testing of the battery.

SUMMARY

The present application aims to at least solve one of the technical problems in the background section. To this end, an objective of the present application is to provide a battery testing apparatus and method, a production method, a device, and a medium, to improve problems of misjudgment, omissions, and incomplete testing in a defect test in the related art.

An embodiment of a first aspect of the present application provides a testing apparatus for testing a battery. A battery to be tested is a stacked battery, and the testing apparatus includes: a first ray source; a second ray source; a first detector, opposite to an exit port of the first ray source; a second detector, opposite to an exit port of the second ray source; a bearing platform, configured to place the battery to be tested, where the bearing platform is movable; a movement trajectory of the bearing platform passes between the first ray source and the first detector, and the movement trajectory of the bearing platform passes between the second ray source and the second detector; and a testing unit, respectively connected to the first detector and the second detector, where the testing unit is configured to perform defect testing on the battery to be tested based on a ray received by the first detector and a ray received by the second detector.

In the technical solution of this embodiment of the present application, the first ray source and the first detector cooperate with each other to detect the first corner of the battery to be tested, and the second ray source and the second detector cooperate with each other to detect the second corner of the battery to be tested, so that during defect testing on the battery to be tested, an angle between a ray and a surface on which the first corner and the second corner of the battery to be tested are located is as close to 90° as possible, thereby reducing distortions in the first corner testing image and the second corner testing image, making the first corner testing image closer to an actual situation of the first corner of the battery to be tested closer, and making the second corner testing image closer to an actual situation of the second corner of the battery to be tested closer. The testing unit performs defect testing on the corners of the battery to be tested through the first corner testing image and the second corner testing image, so that the defect testing on the inside of the battery to be tested is more comprehensive, and problems of misjudgment, omissions, and incompletion of the defect testing are reduced.

In some embodiments, a size D1 of a ray source focus of the first ray source and a size D2 of a ray source focus of the second ray source satisfy: $D1 \leq 10$ μm and/or $D2 \leq 10$ μm. A smaller ray source focus indicates lower geometric unsharpness after the rays penetrate through an object and higher resolution. In this embodiment of the present application, the size of the ray source focus of at least one of the first ray source and the second ray source is limited to be less than or equal to 10 microns, so that an imaging effect on at least one corner can be enhanced, thereby reducing an impact of distortions on the defect testing of the battery to be tested.

In some embodiments, the testing apparatus further includes: a third ray source; and a third detector, opposite to an exit port of the third ray source, where a movement trajectory of the bearing platform also passes between the third ray source and the third detector, and the testing unit is further configured to perform defect testing on the battery to be tested based on a ray received by the third detector. The third ray source and the third detector are arranged to cooperate with each other to perform defect testing on a first surface of the battery to be tested, so as to test the entire battery to be tested, thereby making the defect testing on the battery to be tested more comprehensive.

In some embodiments, a size D3 of a ray source focus of the third ray source satisfies: $10$ μm$<D3 \leq 30$ μm. A middle portion of the battery to be tested has a small distortion, and does not require a small ray source focus for imaging. When the size of the ray source focus of the third ray source is less than or equal to 10 microns, although imaging quality is good, testing time is long. This prolongs the testing time and reduces efficiency. When the size of the ray source focus of the third ray source is greater than 30 microns, the imaging quality is poor which can reduce testing accuracy. Setting the size D3 of the ray source focus of the third ray source to $10$ μm$<D3 \leq 30$ μm can improve the imaging quality, shorten the testing time, and improve the working efficiency.

In some embodiments, an area of a radiation surface of the third ray source on a first surface of the battery to be tested is larger than or equal to half of an area of the first surface, and the first surface is a surface of the battery to be tested that is opposite to the exit port of the third ray source. The area of the radiation surface of the third ray source on the first surface is larger than or equal to half of the area of the first surface. The first surface can be tested through two instances of testing, and the first surface is tested more comprehensively in the two instances of testing.

In some embodiments, the first ray source, the second ray source, and the third ray source are all located on the same side of the bearing platform, to facilitate the arrangement of the ray sources and the detectors.

In some embodiments, at least one of the first ray source, the second ray source, and the third ray source is an integrated ray source. An integrated ray source has a low rework rate, high stability, a small size, and simple later maintenance. The first ray source, the second ray source, or the third ray source is set as the integrated ray source to improve reliability of the testing apparatus.

An embodiment of a second aspect of the present application provides a battery testing method. The testing method uses the testing apparatus in any one of the above embodiments to test a battery to be tested. The battery to be tested includes a first corner and a second corner. The testing method includes: obtaining a testing image of the battery to be tested, where the testing image includes a first corner testing image and a second corner testing image; determining defect information of the battery to be tested based on the testing image; and determining a quality testing result of the battery to be tested based on the defect information of the battery to be tested. The first corner testing image and the second corner testing image of the battery to be tested are obtained, and the defect information of the battery to be tested is determined by analyzing the first corner testing image and the second corner testing image, so that distortions in the first corner testing image and the second corner testing image can be reduced, making the first corner testing image closer to an actual situation of the first corner of the battery to be tested and making the second corner testing image closer to an actual situation of the second corner of the battery to be tested. Therefore, the defect testing on the inside of the battery to be tested is more comprehensive, and problems of misjudgment, omissions, and incompletion of the defect testing are reduced.

In some embodiments, the obtaining a testing image of the battery to be tested includes: controlling the first corner to be located between the first ray source and the first detector, and controlling the second corner to be located between the second ray source and the second detector; controlling a ray emitted by the first ray source to be projected to the first detector through the first corner of the battery to be tested; controlling a ray emitted by the second ray source to be projected to the second detector through the second corner of the battery to be tested; determining the first corner testing image based on the ray received by the first detector; determining the second corner testing image based on the ray received by the second detector; and determining the testing image of the battery to be tested based on the first corner testing image and the second corner testing image. By controlling the first corner to be located between the first ray source and the first detector and controlling the second corner to be located between the second ray source and the second detector, during defect testing on the battery to be tested, an angle between a ray and a surface on which the first corner and the second corner of the battery to be tested are located is as close to 90° as possible, thereby reducing distortions in the first corner testing image and the second corner testing image, making the first corner testing image closer to an actual situation of the first corner of the battery to be tested closer, and making the second corner testing image closer to an actual situation of the second corner of the battery to be tested closer. The defect testing is performed on the corners of the battery to be tested through the first corner testing image and the second corner testing image, so that the defect testing on the inside of the battery to be tested is more comprehensive, and problems of misjudgment, omissions, and incompletion of the defect testing are reduced.

In some embodiments, the determining the first corner testing image based on the ray received by the first detector includes: acquiring, based on the ray received by the first detector, a plurality of first original images that include the first corner; and processing the plurality of first original images to obtain the first corner testing image.

In some embodiments, the processing the plurality of first original images to obtain the first corner testing image includes: filtering the plurality of first original images to obtain first filtered images; denoising the first filtered images to obtain first denoised images; and capturing first testing regions in the first denoised images to obtain the first corner testing image, where the first testing regions are regions, which include the first corner, in the first denoised images. The plurality of first original images are acquired and processed. If an error occurs in one of the first original images, and the remaining first original images are still correct, impact of the error on a testing result can be reduced. In this embodiment of the present application, filtering can remove irrelevant information in the plurality of first original images, and can improve a signal-to-noise ratio of the first original images. The first denoised images are obtained by denoising the first filtered images, so that random noises such as quantum noise, aliasing noise, and electronic noise in the first filtered image can be removed, thereby greatly improving the signal-to-noise ratio of the first filtered images. The first original images acquired by the first ray source and the first detector include the first corner and other regions. In this embodiment of the present application, regions with the first corner are captured. Subsequent calculations can be reduced, and impact of errors in other regions on defect testing of the first corner can also be reduced.

In some embodiments, the first corner is adjacent to the second corner; the battery to be tested further includes a third corner and a fourth corner that are adjacent to each other; the third corner is adjacent to the first corner, and the fourth corner is adjacent to the second corner; and the obtaining a testing image of the battery to be tested includes: controlling the battery to be tested to move, to cause the third corner to be located between the first ray source and the first detector and cause the fourth corner to be located between the second ray source and the second detector; controlling a ray emitted by the first ray source to be projected to the first detector through the third corner of the battery to be tested; controlling a ray emitted by the second ray source to be projected to the second detector through the fourth corner of the battery to be tested; determining a third corner testing image of the third corner based on the ray received by the first detector; determining a fourth corner testing image of the fourth corner based on the ray received by the second detector; and determining defect information of the battery to be tested based on the first corner testing image, the second corner testing image, the third corner testing image, and the fourth corner testing image. Through the above steps, the third corner and the fourth corner of the battery to be tested can also be tested, so that the battery to be tested can be tested more comprehensively. Meanwhile, the third corner testing image is closer to an actual situation of the third corner of the battery to be tested, and the fourth corner testing image is closer to an actual situation of the fourth corner of the battery to be tested, thereby reducing problems of misjudgment, omissions, and incompletion of the defect testing.

In some embodiments, the battery to be tested is located on a bearing platform; the third corner and the first corner are arranged in a first direction; the fourth corner and the second corner are arranged in the first direction; and the controlling the battery to be tested to move, to cause the third corner to be located between the first ray source and the first detector and cause the fourth corner to be located between the second ray source and the second detector includes: controlling the bearing platform to move in the first direction, to cause the third corner to be located between the first ray source and the first detector and cause the fourth corner to be located between the second ray source and the second detector. Compared with controlling the battery to be tested to move, controlling the bearing platform to move is simpler and does not need to change a positional relationship between the battery to be tested and the bearing platform, so that the battery to be tested is more stable.

In some embodiments, the battery to be tested further includes a first surface; the first surface is perpendicular to a thickness direction of the battery to be tested; the first corner and the second corner are both located on the first surface; and the obtaining a testing image of the battery to be tested includes: controlling the first surface to be located between the third ray source and the third detector; controlling a ray emitted by the third ray source to be projected to the third detector through the first surface of the battery to be tested; determining a first surface testing image of the first surface based on the ray received by the third detector; and determining the defect information of the battery to be tested based on the first corner testing image, the second corner testing image, the third corner testing image, the fourth corner testing image, and the first surface testing image. The above steps further include testing the first surface of the battery to be tested, so that the battery to be tested is tested more comprehensively.

In some embodiments, the first surface includes a first region and a second region that are connected to each other; and the controlling a ray emitted by the third ray source to be projected to the third detector through the first surface of the battery to be tested includes: controlling the ray emitted by the third ray source to be projected to the third detector at least through the first region; and controlling the ray emitted by the third ray source to be projected to the third detector at least through the second region. Through the two instances of testing on the first surface, omissions of the testing on the first surface can be reduced, thereby making the defect testing on the battery to be tested more comprehensive.

In some embodiments, the determining defect information of the battery to be tested based on the testing image includes: determining a defect quantity and/or a defect size of the battery to be tested based on the testing image; and determining the defect information of the battery to be tested based on the defect quantity and/or the defect size. The defect quantity and the defect size are both standards for measuring defects in the battery to be tested. The defect quantity is a sum of quantities of all defects in the battery to be tested, and the defect size is a size of each individual defect.

In some embodiments, the determining a quality testing result of the battery to be tested based on the defect information of the battery to be tested includes: in response to the defect quantity being greater than a preset quantity, determining that the battery to be tested is disqualified. When the defect quantity is greater than the preset quantity, it indicates that there are many defects in the battery to be tested, and the battery to be tested is determined to be disqualified.

In some embodiments, the determining a quality testing result of the battery to be tested based on the defect information of the battery to be tested includes: in response to the defect size being greater than a preset size, determining that the battery to be tested is disqualified. When the defect size is greater than the preset quantity, it indicates that the defect size in the battery to be tested is large, and the battery to be tested is determined to be disqualified.

An embodiment of a third aspect of the present application provides a battery testing apparatus. A battery to be tested includes a first corner and a second corner; the first corner is adjacent to the second corner; and the battery testing apparatus includes: an obtaining module, configured to obtain a testing image of the battery to be tested, where the testing image includes a first corner testing image and a second corner testing image; a first determining module, configured to determine defect information of the battery to be tested based on the testing image; and a second determining module, configured to determine quality testing result of the battery to be tested based on the defect information of the battery to be tested.

An embodiment of a fourth aspect of the present application provides a battery production method. The method includes: using the method in any one of the above embodiments to test quality of the battery to be tested, to determine a quality testing result of the battery to be tested. The battery production method according to this embodiment of the present application can determine defects of the battery to be tested, and can determine the quality of the battery to be tested based on the defects of the battery to be tested.

In some embodiments, the method further includes: in response to the quality testing result of the battery to be tested being disqualified, culling out a disqualified battery. The quality of the battery to be tested can be determined based on the quality testing result of the battery to be tested, and the disqualified battery can be culled out, so that stability of an apparatus or device using the battery can be improved.

An embodiment of a fifth aspect of the present application provides an electronic device, including: at least one processor; and a memory communicably connected with the at least one processor, where the memory stores an instruction that is executable by the at least one processor; and the instruction, when executed by the at least one processor, causes the at least one processor to perform the battery testing method according to any one of the above embodiments or the battery production method according to any one of the above embodiments.

An embodiment of a sixth aspect of the present application provides a battery production device, including the electronic device in the above embodiment.

An embodiment of a seventh aspect of the present application provides a computer-readable storage medium, having a computer program stored therein. The computer program, when executed by a processor, implements the battery testing method according to any one of the above embodiments or the battery production method according to any one of the above embodiments.

An embodiment of an eighth aspect of the present application provides a computer program product, including a computer program. The computer program, when executed by a processor, implements the battery testing method according to any one of the above embodiments or the battery production method according to any one of the above embodiments.

The foregoing descriptions are merely an overview of the technical solutions in the present application. In order that technical means of the present application can be understood more clearly so that the technical solutions can be implemented according to content of the descriptions, and in order that the foregoing and other objectives, features, and advantages of the present application can be understood more clearly, specific implementations of the present application are described below.

DESCRIPTION OF DRAWINGS

In the drawings, unless otherwise specified, like reference numerals indicate like or similar parts or elements throughout multiple drawings. These drawings are not necessarily drawn to scale. It should be understood that these accompanying drawings only depict some implementations disclosed by the present application and should not be considered as limiting the scope of the present application.

FIG. 11 is a flowchart of step S101 according to some embodiments of the present application;

FIG. 12 is a flowchart of step S114 according to some embodiments of the present application;

FIG. 15 is a flowchart of step S101 according to some other embodiments of the present application;

FIG. 16 is a flowchart of step S1114 according to some embodiments of the present application;

FIG. 17 is a flowchart of step S102 according to some embodiments of the present application;

FIG. 18 is a flowchart of a battery production method according to some embodiments of the present application; and FIG. 19 is a flowchart of a battery testing method according to some embodiments of the present application.

DETAILED DESCRIPTION

Figure 1:
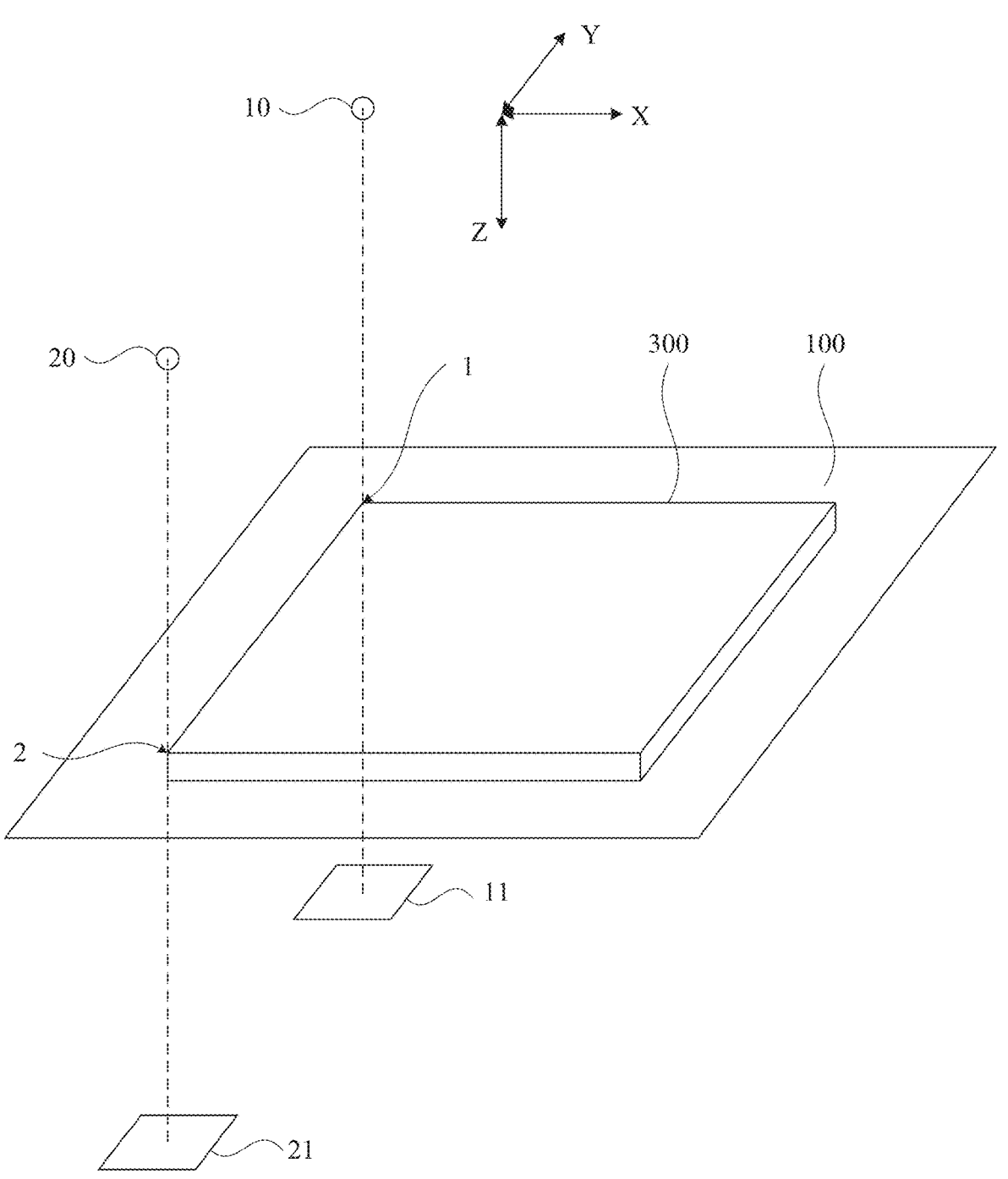
FIG. 1 is a schematic structural diagram of a testing apparatus according to some embodiments of the present application.

Embodiments of the technical solutions of the present application will be described in detail below with reference to the accompanying drawings. The following embodiments are only used to more clearly illustrate the technical solutions of the present application, therefore only as examples, and cannot be used to limit the scope of protection of the present application.

Unless otherwise defined, all technical and scientific terms used herein have the same meanings as those commonly understood by those skilled in the art to which the present application pertains to. The terms used herein are for the purpose of describing specific embodiments only and are not intended to limit the present application. The terms "including" and "having" and any variations thereof in the specification and claims of the present application and the aforementioned BRIEF DESCRIPTION OF DRAWINGS are intended to cover non-exclusive inclusion.

In the description of the embodiments of the present application, the technical terms "first", "second", etc., are used only to distinguish between different objects and are not to be understood as indicating or implying a relative importance or implicitly specifying the number, particular order, or primary and secondary relationship of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may represent three situations: A exists alone, both A and B exist, and B exists alone. Moreover, the character "/" herein generally indicates that the context objects are in an "or" relationship.

In the description of the embodiments of the present application, the term "a plurality of" refers to more than two (including two), and similarly, "a plurality of groups" refers to more than two groups (including two groups); and "a plurality of sheets" refers to more than two sheets (including two sheets).

In the description of the embodiments of the present application, the orientation or positional relationships indicated by the technical terms "center", "longitudinal", "transverse", "length", "width", "thickness", "upper", "lower", "front", "back", "left", "right", "vertical", "horizontal", "top", "bottom", "inner", "outer", "clockwise", "counter-clockwise", "axial", "radial", "circumferential", etc. are based on the orientation or positional relationships shown in the accompanying drawings, and are only for convenience of description of the present application and simplification of the description, rather than indicating or implying that the indicated apparatus or element must have a specific orientation, be constructed and operate in a specific orientation, and therefore, cannot be understood as a limitation to the present application.

In the description of the embodiments of the present application, unless otherwise specified and limited, the technical terms "mounting", "connection", "connection", and "fixation" should be understood in a broad sense, for example, they can be fixed connection, detachable connection, or integration; or they can be mechanical connection or electrical connection; or they can be direct connection, indirect connection through an intermediate medium, or communication of the interiors of two elements or the relationship of interaction between two elements. For those of ordinary skill in the art, the specific meanings of the above terms in the embodiments of the present application can be understood according to specific situations.

At present, from the perspective of the development of the market situation, power batteries are increasingly more widely used. Power batteries are not only applied in energy storage power source systems such as water, fire, wind and solar power stations, but also widely applied in electric transport tools, such as electric bicycles, electric motorcycles, and electric vehicles, as well as many fields, such as military equipment and aerospace. With the continuous expansion of the application field of the power batteries, the market demand is also constantly increasing.

Defects may occur in a battery during production and use of the battery. For example, during the production of the battery, defects such as wrinkles, folds, or breaks of electrodes may occur. During the use of the battery, the battery may be bumped, causing the electrodes to break. These defects cannot be observed from the outside of the battery, so that the inside of the battery needs to be tested.

Rays emitted by ray sources are detected by detectors after passing through the battery, thus forming corresponding testing images. When a ray emitted by a ray source is perpendicular to a surface for battery testing, an actual length of the ray passing through the battery is equal to a thickness of the battery, and the testing image is accurate at this time. When an angle between the ray emitted by the ray source and the surface for battery testing is less than 90°, an actual length of the ray passing through the battery should be greater than the thickness of the battery, and the testing image may have a distortion. A smaller angle between the ray and the surface for battery testing indicates a severer distortion.

For a stacked battery, the overall stacked battery is a rectangular parallelepiped, and corners of the rectangular parallelepiped are easily bumped. After being bumped, the battery may not appear defective from the outside, but an internal electrode plate of the battery may be broken due to the bump. This affects reliability of the battery. In the related art, during testing on a battery, a ray source corresponds to a middle portion of the battery. Since corners of the battery are relatively outward, an angle between a ray emitted by the ray source and a surface on which the corners of the battery are located is small, causing a large distortion in a testing image. During analysis of the testing image, there is a difference between the testing image and an actual situation of the battery, so that defect testing on the battery may have misjudgment, omissions, and incompletion.

An embodiment of the present application provides a testing apparatus for testing a battery. The testing apparatus includes a first ray source, a first detector, a second ray source a second detector, a bearing platform, and a testing unit. The first detector is opposite to an exit port of the first ray source, and the second detector is opposite to an exit port of the second ray source. The bearing platform is configured to place a battery to be tested. The bearing platform is movable. A movement trajectory of the bearing platform passes between the first ray source and the first detector, and the movement trajectory of the bearing platform passes between the second ray source and the second detector. The testing unit is connected to the first detector and the second detector, and is configured to perform defect testing on the battery to be tested by using a ray received by the first detector and a ray received by the second detector. The testing apparatus according to the embodiments of the present application can test the corners of the battery to be tested, so that the first ray source and the second ray source are respectively opposite to the first corner and the second corner of the battery to be tested. In this way, during testing, distortions in the first corner testing image and the second corner testing image can be reduced, thereby improving accuracy of testing on the inside of the battery to be tested and reducing problems of misjudgment, omissions, and incompletion of the defect testing.

The testing apparatus for testing the battery in the embodiments of the present application can test batteries that have just been produced, and can also test batteries that have been used for a period of time, thereby improving the accuracy of testing on the insides of the batteries and reducing problems of misjudgment, omissions, and incompletion of the defect testing.

An embodiment of the present application provides a testing apparatus for testing a battery. FIG. 1 is a schematic structural diagram of a testing apparatus according to some embodiments of the present application. For ease of explanation, FIG. 1 also shows a battery 300 to be tested. The battery 300 to be tested is a stacked battery. The testing apparatus includes a first ray source 10, a first detector 11, a second ray source 20, a second detector 21, and a bearing platform 100. The first detector 11 is opposite to an exit port of the first ray source 10, and the second detector 21 is opposite to an exit port of the second ray source 20. The bearing platform 100 is configured to place the battery 300 to be tested. The bearing platform 100 is movable. A movement trajectory of the bearing platform 100 passes between the first ray source 10 and the first detector 11, and the movement trajectory of the bearing platform 100 passes between the second ray source 20 and the second detector 21.

Figure 2:
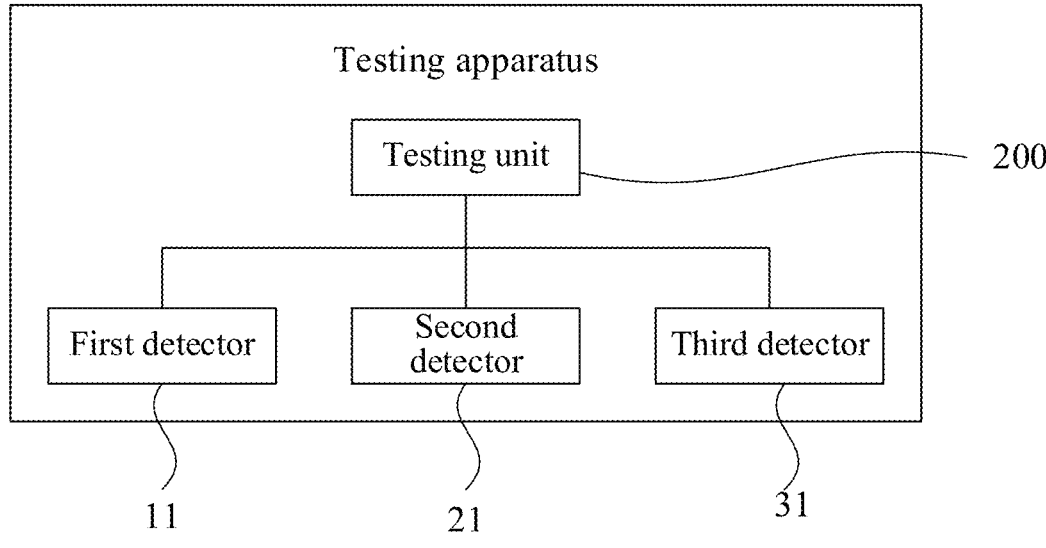
FIG. 2 is a block diagram of a testing apparatus according to some embodiments of the present application.

FIG. 2 is a block diagram of a testing apparatus according to some embodiments of the present application. Referring to FIG. 2, the testing apparatus further includes a testing unit 200, and the testing unit 200 is respectively connected to the first detector 11 and the second detector 21. The testing unit 200 is configured to perform defect testing on the battery 300 to be tested based on a ray received by the first detector 11 and a ray received by the second detector 21.

In this embodiment of the present application, rays emitted by ray sources such as the first ray source 10 and the second ray source 20 all have penetration, and materials with different thicknesses have different degrees of attenuation on the rays, so that detectors such as the first detector 11 and the second detector 21 detect different amounts of rays. There is a layer of photoluminescent material inside a detector. After receiving a ray, a photosensitive material emits light, and a light signal is transmitted to a photoelectric converter to form an electrical signal. A digital signal is then output through an internal electrical signal transmission circuit, representing an image with light and shade contrast. The ray may be attenuated to an extent after passing through an object under test. More rays pass through the object mean more light-emitting signals of the photosensitive material. It shows that the region is brighter on a final image. Conversely, fewer rays pass through the object mean that the region is darker on the image.

Referring to FIG. 1, the battery 300 to be tested includes a first corner 1 and a second corner 2. In this embodiment of the present application, a ray emitted by the first ray source 10 is projected to the first detector 11 through the first corner 1 of the battery 300 to be tested that is placed on the bearing platform 100, and the first detector 11 is configured to determine a first corner testing image of the first corner based on the received ray. A ray emitted by the second ray source 20 is projected to the second detector 21 through the second corner 2 of the battery 300 to be tested that is placed on the bearing platform 100, and the second detector 21 is configured to determine a second corner testing image of the second corner based on the received ray. That is, the testing unit 200 is configured to perform the defect testing on the battery 300 to be tested based on the first corner testing image and the second corner testing image.

In this embodiment of the present application, the first detector 11 is opposite to the exit port of the first ray source 10. When the first corner 1 of the battery 300 to be tested moves between the first detector 11 and the first ray source 10, the ray emitted by the first ray source 10 is detected by the first detector 11 after passing through the battery 300 to be tested, thereby displaying an image of the first corner 1 of the battery 300 to be tested and obtaining the first corner testing image.

In this embodiment of the present application, the second detector 21 is opposite to the exit port of the second ray source 20. When the second corner 2 of the battery 300 to be tested moves between the second detector 21 and the second ray source 20, the ray emitted by the second ray source 20 is detected by the second detector 21 after passing through the battery 300 to be tested, thereby displaying an image of the second corner 2 of the battery 300 to be tested and obtaining the second corner testing image.

The stacked battery is similar to a rectangular parallelepiped which has eight corners. The battery 300 to be tested has two large surfaces that are opposite to each other and four side surfaces connected to the two large surfaces. In an implementation of the present application, the first corner 1 and the second corner 2 may be two adjacent corners on the same surface. For example, the first corner 1 and the second corner 2 are two adjacent corners on the same large surface.

Exemplarily, when the testing apparatus is used to test the battery 300 to be tested, the battery 300 to be tested can be placed on the bearing platform 100, and the bearing platform 100 is moved, so that a large surface (for example, a first surface 5) of the battery 300 to be tested abuts against a bearing surface of the bearing platform 100, that is, a thickness direction Z of the battery 300 to be tested is perpendicular to the bearing surface. In this case, the first corner 1 and the second corner 2 may be two corners on a large surface of the battery 300 to be tested that faces a ray source.

The battery 300 to be tested further includes a third corner 3 and a fourth corner 4. The third corner 3 and the fourth corner 4 are located on the same surface of the battery 300 to be tested as the first corner 1 and the second corner 2. After the testing apparatus tests the first corner 1 and the second corner 2 of the battery 300 to be tested, the battery 300 to be tested or the testing apparatus may be moved, so that the first ray source 10 is opposite to the third corner 3, and the second ray source 20 is opposite to the fourth corner 4. The third corner 3 and the fourth corner 4 may be tested. Since the rays have penetration, the rays may pass through the corresponding corners during the testing, that is, each corner of the battery 300 to be tested is tested by the testing apparatus.

In an implementation of the present application, the first ray source 10 and the second ray source 20 may be ray sources of the same ray. For example, the first ray source 10 and the second ray source 20 are both X-ray sources, or the first ray source 10 and the second ray source 20 are both α-ray sources, or the first ray source 10 and the second ray source 20 are both β-ray sources, or the first ray source 10 and the second ray source 20 are both γ-ray sources.

In another implementation of the present application, the first ray source 10 and the second ray source 20 may be ray sources of different rays. For example, one of the first ray source 10 and the second ray source 20 may be an X-ray source, and the other one of the first ray source 10 and the second ray source 20 may be an α-ray source; or one of the first ray source 10 and the second ray source 20 may be an α-ray source, and the other one of the first ray source 10 and the second ray source 20 may be a β-ray source, or other combinations are acceptable. This embodiment of the present application does not impose a limitation on this.

In an implementation of the present application, the first detector 11 and the second detector 21 may be the same detector. For example, the first detector 11 and the second detector 21 are both flat panel detectors, or the first detector 11 and the second detector 21 are both linear array detectors. Exemplarily, the detectors use detectors made of a cesium iodide photosensitive material.

In another implementation of the present application, the first detector 11 and the second detector 21 may be different detectors. For example, one of the first detector 11 and the second detector 21 may be a flat panel detector, and the other one of the first detector 11 and the second detector 21 is a linear array detector.

Exemplarily, the linear array detector may include a time delay integration (TDI) detector.

In this embodiment of the present application, the bearing platform 100 may be a conveyor belt, and the battery 300 to be tested may be placed on the conveyor belt. Or, the bearing platform 100 may be an annular guide rail, and the battery 300 to be tested may be placed on the annular guide rail. When the conveyor belt or the annular guide rail moves, the battery 300 to be tested that is located on the conveyor belt or the annular guide rail is driven to move, so that continuous testing can be implemented, and testing efficiency can be improved.

In this embodiment of the present application, the testing unit 200 and the first detector 11 may be connected in a wired or wireless manner, and the testing unit 200 and the second detector 21 may be connected in a wired or wireless manner.

In this embodiment of the present application, the first ray source 10 and the first detector 11 cooperate with each other to detect the first corner 1 of the battery 300 to be tested, and the second ray source 20 and the second detector 21 cooperate with each other to detect the second corner 2 of the battery 300 to be tested, so that during defect testing on the battery 300 to be tested, an angle between a ray and a surface on which the first corner 1 and the second corner 2 of the battery 300 to be tested are located is as close to 90° as possible, thereby reducing distortions in the first corner testing image and the second corner testing image, making the first corner testing image closer to an actual situation of the first corner 1 of the battery 300 to be tested closer, and making the second corner testing image closer to an actual situation of the second corner 2 of the battery 300 to be tested closer. The testing unit performs defect testing on the corners of the battery 300 to be tested through the first corner testing image and the second corner testing image, so that the defect testing on the inside of the battery 300 to be tested is more comprehensive, and problems of misjudgment, omissions, and incompletion of the defect testing are reduced.

In the related art, in a middle region of the battery 300 to be tested, the rays are incident from one of the large surfaces of the battery 300 to be tested and may exit from another large surface of the battery 300 to be tested. In the vicinity of the corners of the battery 300 to be tested, since the angles between the rays and the large surfaces of the battery 300 to be tested are small, the rays are incident from the large surfaces of the battery 300 to be tested and may exit from the side surfaces of the battery 300 to be tested. This may make distortions at the corners of the battery 300 to be tested more apparent. In this embodiment of the present application, since the first ray source 10 and the second ray source 20 are respectively opposite to the first corner and the second corner of the battery 300 to be tested, the angles between the rays and the large surfaces of the battery 300 to be tested are closer to 90° in the vicinity of the first corner and the second corner of the battery 300 to be tested. This can reduce situations in which the rays are incident from the large surfaces of the battery 300 to be tested and exit from the side surfaces of the battery 300 to be tested, thereby reducing the distortions in the first corner testing image and the second corner testing image.

In an implementation of the present application, the first corner 1, the second corner 2, the third corner 3, and the fourth corner 4 are all located on the first surface 5. In a testing process, the testing apparatus and the battery 300 to be tested can be moved to: cause a center line of the ray emitted by the first ray source 10 to pass through a vertex of the first corner 1 and be perpendicular to the first surface 5 and cause a center line of the ray emitted by the second ray source 20 to pass through a vertex of the second corner 2 and be perpendicular to the first surface 5. This can reduce impact of the distortions.

In this embodiment of the present application, when the first ray source 10 and the second ray source 20 are placed in the testing process, the first ray source 10 can correspond to a position of the first corner 1 of the battery 300 to be tested, and the second ray source 20 can correspond to a position of the second corner 2 of the battery 300 to be tested. In this way, the first corner 1 and the second corner can be tested simultaneously, and testing efficiency is higher.

According to some embodiments of the present application, a size D1 of a ray source focus of the first ray source 10 and a size D2 of a ray source focus of the second ray source 20 satisfy: D1≤10 μm and/or D2≤10 μm.

Exemplarily, the size of the ray source focus may be a diameter of the ray source focus.

Exemplarily, the size D1 of the ray source focus of the first ray source 10 is ≤10 μm; or the size D2 of the ray source focus of the second ray source 20 is ≤10 μm; or the size D1 of the ray source focus of the first ray source 10 is ≤10 μm, and the size D2 of the ray source focus of the second ray source 20 is ≤10 μm.

In this embodiment of the present application, a point on a target to which an electron lens focuses an electron beam is a ray source focus.

A smaller ray source focus indicates lower geometric unsharpness after the rays penetrate through an object and higher resolution. In this embodiment of the present application, the size of the ray source focus of at least one of the first ray source 10 and the second ray source 20 is limited to be less than or equal to 10 microns, so that an imaging effect on at least one corner can be enhanced, thereby reducing an impact of distortions on the defect testing of the battery 300 to be tested.

Figure 3:
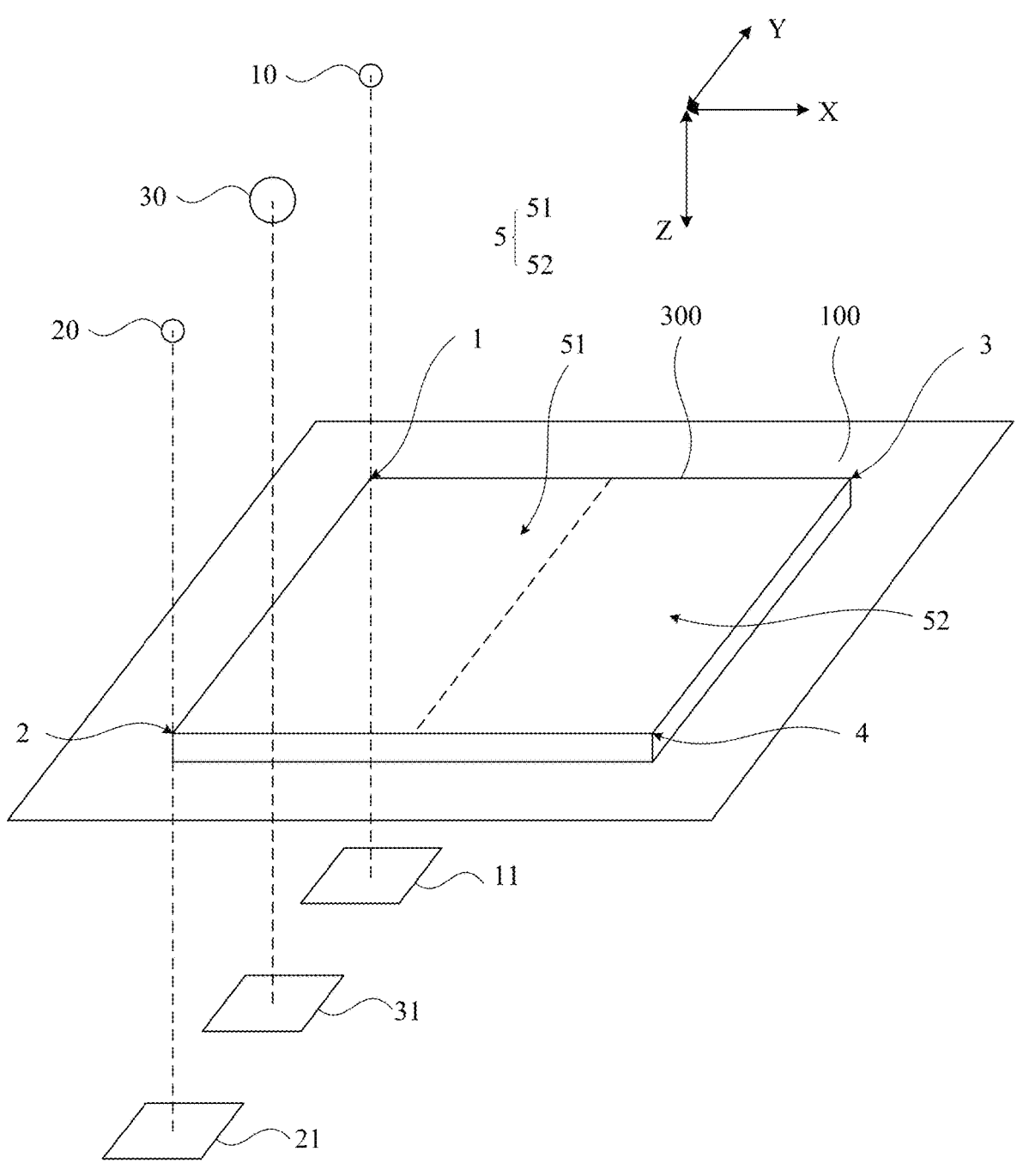
FIG. 3 is a schematic structural diagram of a testing apparatus according to some other embodiments of the present application.

According to some embodiments of the present application, FIG. 3 is a schematic structural diagram of a testing apparatus according to some other embodiments of the present application. For ease of explanation, FIG. 3 also shows a battery 300 to be tested. Referring to FIG. 3, the battery 300 to be tested further includes a first surface 5. The first surface 5 is perpendicular to a thickness direction Z of the battery 300 to be tested. The first corner 1 and the second corner 2 are both located on the first surface 5. The testing apparatus further includes a third ray source 30 and a third detector 31. The third detector 31 is opposite to an exit port of the third ray source 30. The movement trajectory of the bearing platform 100 also passes between the third ray source 30 and the third detector 31. The testing unit 200 is further configured to perform defect testing on the battery to be tested based on a ray received by the third detector 31.

In this embodiment of the present application, the first surface 5 is a large surface of the battery 300 to be tested, and the exit port of the third ray source 30 is opposite to the third detector 31. When the first surface 5 of the battery 300 to be tested is moved between the third detector 31 and the third ray source 30, a ray emitted by the third ray source 30 is detected by the third detector 31 after passing through the battery 300 to be tested, thereby displaying an image of the first surface 5 of the battery 300 to be tested.

The ray emitted by the third ray source 30 is projected to the third detector 31 through the first surface 5 of the battery 300 to be tested that is placed on the bearing platform 100. Furthermore, the third detector 31 is configured to determine a first surface testing image of the first surface 5 based on the received ray. The testing unit 200 can perform the defect testing on the battery 300 to be tested based on the first surface testing image.

In this embodiment of the present application, a type of the third ray source 30 may be the same as a type of one of the first ray source 10 and the second ray source 20; or a type of the third ray source 30 may be the same as types of both the first ray source 10 and the second ray source 20; or a type of the third ray source 30 may be different from types of both the first ray source 10 and the second ray source 20.

Exemplarily, the third ray source 30 may be one of an X-ray source, an α-ray source, a β-ray source, and a γ-ray source.

In this embodiment of the present application, the third ray source 30 and the third detector 31 are arranged to cooperate with each other to perform defect testing on the first surface 5 of the battery 300 to be tested, so as to test the entire battery 300 to be tested, thereby making the defect testing on the battery 300 to be tested more comprehensive.

In an implementation of the present application, in the testing process, the testing apparatus and the battery 300 to be tested can be moved to cause the center line of the ray emitted by the third ray source 30 to pass through a side on which the first corner 1 and the second corner 2 are located and be perpendicular to the first surface 5. This can reduce the impact of the distortion. Exemplarily, the center line of the ray emitted by the third ray source 30 passes through a midpoint of the side on which the first corner 1 and the second corner 2 are located.

According to some embodiments of the present application, a size D3 of a ray source focus of the third ray source 30 satisfies: 10 µm<D3≤30 µm.

Exemplarily, the size D3 of the ray source focus of the third ray source 30 is equal to 20 µm.

In this embodiment of the present application, a middle portion of the battery 300 to be tested has a small distortion, and does not require a small ray source focus for imaging. When the size of the ray source focus of the third ray source 30 is less than or equal to 10 microns, although imaging quality is good, testing time is long. This prolongs the testing time and reduces efficiency. When the size of the ray source focus of the third ray source 30 is greater than 30 microns, the imaging quality is poor which can reduce testing accuracy. Setting the size of the ray source focus of the third ray source 30 to be greater than 10 microns and less than or equal to 30 microns can improve the imaging quality, shorten the testing time, and improve the working efficiency.

According to some embodiments of the present application, an area of a radiation surface of the third ray source 30 on the first surface 5 of the battery 300 to be tested is larger than or equal to half of an area of the first surface 5, and the first surface 5 is a surface of the battery 300 to be tested that is opposite to the exit port of the third ray source 30.

In this embodiment of the present application, the first surface 5 may be a large surface of the battery 300 to be tested.

Figure 4:
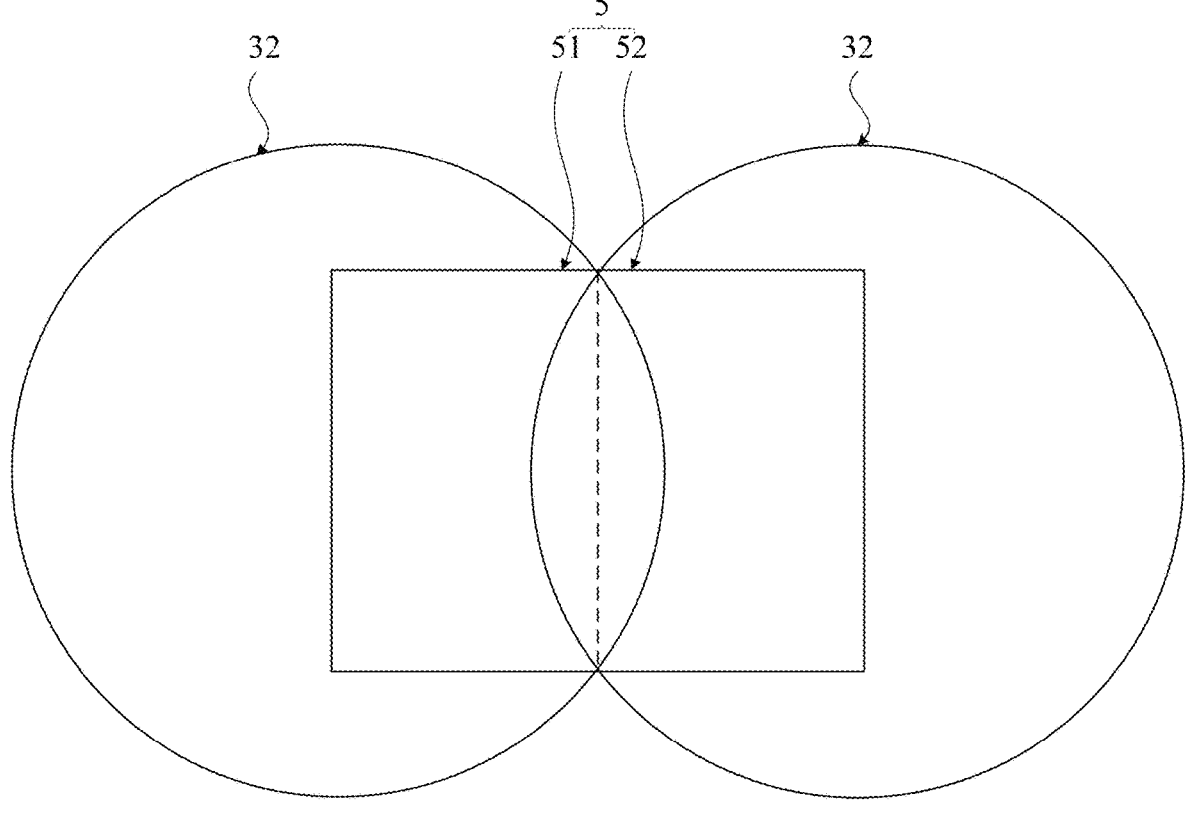
FIG. 4 is a schematic diagram of a first surface and a radiation surface according to some embodiments of the present application.

If the rays emitted by the ray sources are completely projected onto the object under test, radiation surfaces of the ray sources on the object under test is generally circular. FIG. 4 is a schematic diagram of a first surface and a radiation surface according to some embodiments of the present application. Referring to FIG. 4, the first surface 5 includes a first region 51 and a second region 52, and areas of the first region 51 and the second region 52 are equal. A radiation surface 32 of the third ray source 30 on the first surface 5 at least includes one of the first region 51 and the second region 52. Radiation surfaces 32 of two instances may overlap.

In the testing apparatus shown in FIG. 3, the first ray source 10, the second ray source 20, and the third ray source 30 are placed close to each other, and the third ray source 30 is located between the first ray source 10 and the second ray source 20. During the same instance of testing, the first ray source 10, the second ray source 20, and the third ray source 30 can test the same battery 300 to be tested. In FIG. 3, the third ray source 30, the first ray source 10, and the second ray source 20 are on one straight line, so that by moving the testing apparatus and the battery 300 to be tested, during the first instance of testing, the center line of the ray emitted by the first ray source 10 passes through the vertex of the first corner 1 and is perpendicular to the first surface 5; meanwhile, the center line of the ray emitted by the second ray source 20 passes through the vertex of the second corner 2 and is perpendicular to the first surface 5; and in addition, the center line of the ray emitted by the third ray source 30 passes through the midpoint of the side on which the first corner 1 and the second corner 2 are located. During the second instance of testing, the center line of the ray emitted by the first ray source 10 passes through the vertex of the third corner 3 and is perpendicular to the first surface 5; meanwhile, the center line of the ray emitted by the second ray source 20 passes through the vertex of the fourth corner 4 and is perpendicular to the first surface 5; and in addition, the center line of the ray emitted by the third ray source 30 passes through the midpoint of the side on which the third corner 3 and the fourth corner 4 are located.

In other implementations, the third ray source 30, the first ray source 10, and the second ray source 20 may not be on one straight line.

Figure 5:
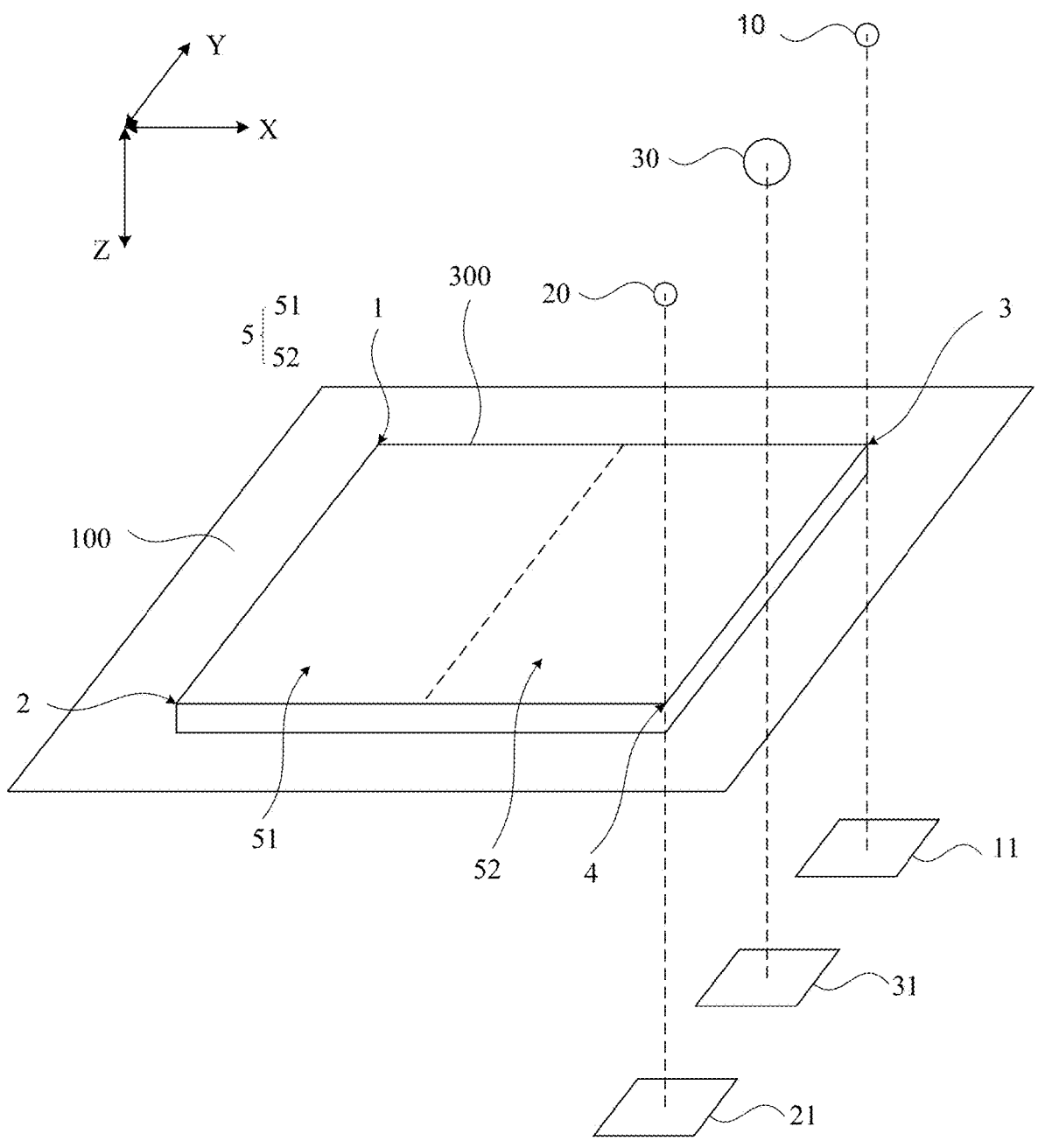
FIG. 5 is a schematic structural diagram of a testing apparatus according to some other embodiments of the present application.
Figure 6:
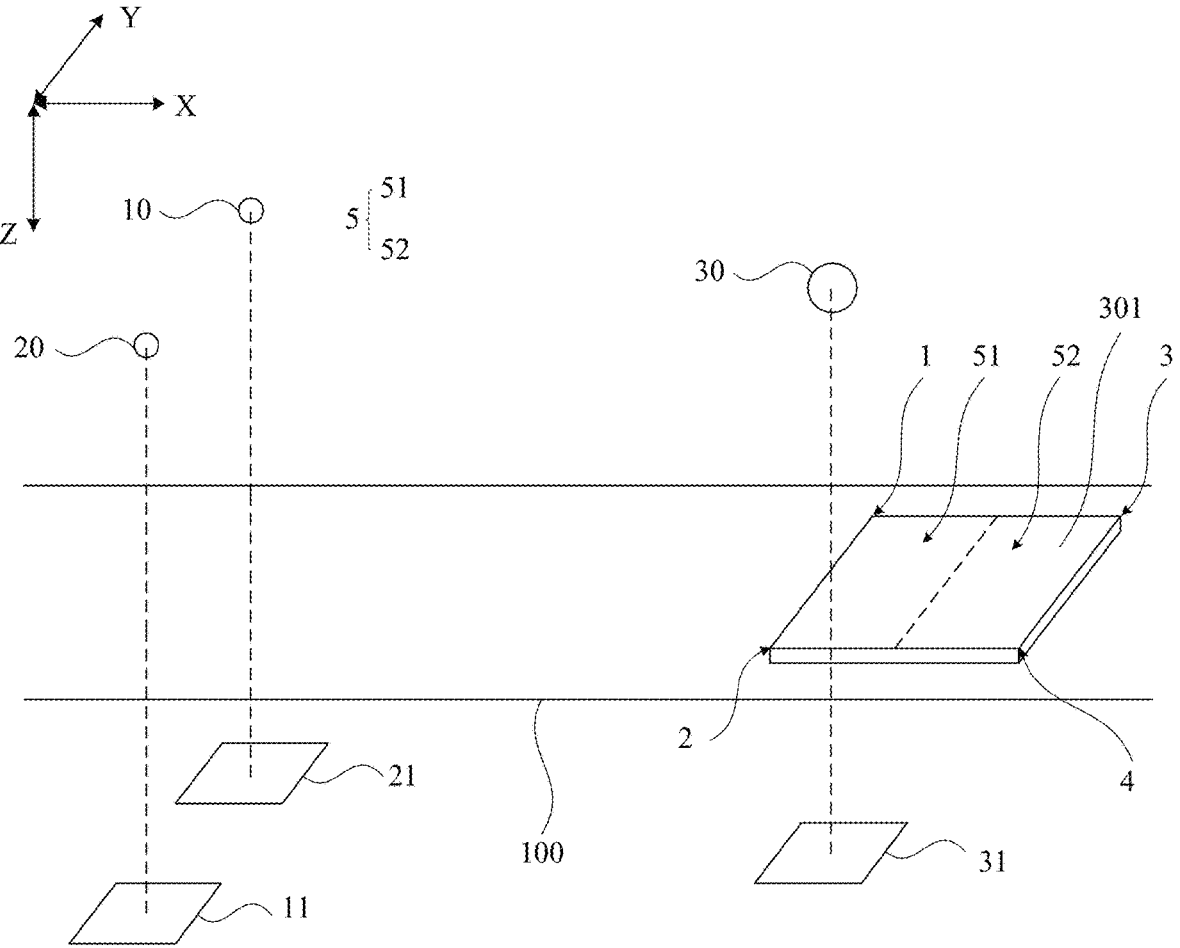
FIG. 6 is a schematic structural diagram of a testing apparatus according to some other embodiments of the present application.

FIG. 5 is a schematic structural diagram of a testing apparatus according to some other embodiments of the present application. A difference between FIG. 3 and FIG. 5 is that the battery 300 to be tested moves a distance in a first direction X. A positional relationship of the testing apparatuses shown in FIG. 3 and FIG. 5 is used for explanation. In FIG. 3 and FIG. 5, the first ray source 10, the second ray source 20, and the third ray source 30 are arranged in a connection direction Y the first corner 1 and the second corner 2. In some embodiments of the present application, any two of the first direction X, the connection direction Y of the first corner 1 and the second corner 2, and the thickness direction Z can be perpendicular to each other.

In FIG. 3 and FIG. 5, testing on a battery 300 to be tested may be divided into two instances. First, referring to FIG. 3, the first ray source 10 and the first detector 11 test the first corner 1 of the battery 300 to be tested. The second ray source 20 and the second detector 21 test the second corner 2 of the battery 300 to be tested. The third ray source 30 and the third detector 31 test the first region 51 of the first surface 5 of the battery 300 to be tested. Then, the battery 300 to be tested is moved in the first direction X. Referring to FIG. 5, the third ray source 30 and the third detector 31 test the second region 52 of the first surface 5 of the battery 300 to be tested. The first ray source 10 and the first detector 11 test the third corner 3 of the battery 300 to be tested. The second ray source 20 and the second detector 21 test the fourth corner 4 of the battery 300 to be tested. The testing on a battery 300 to be tested is completed. Then, the above steps can be used to test other batteries to be tested.

In this embodiment of the present application, in FIG. 5 relative to FIG. 3, a distance that the battery 300 to be tested is moved in the first direction X is equal to a distance between the first corner 1 and the third corner 3.

FIG. 6 to FIG. 9 are schematic structural diagrams of a testing apparatus according to some other embodiments of the present application. For ease of explanation, a battery 300 to be tested is also shown in FIG. 6 to FIG. 9. Referring to FIG. 6 to FIG. 9, the first ray source 10 and the second ray source 20 are placed close to each other, and the third ray source 30 is placed far from the first ray source 10 and the second ray source 20. In FIG. 6 to FIG. 9, the third ray source 30 is located on a right side of the first ray source 10, and the third ray source 30 is located on a right side of the second ray source 20. In other implementations, the third ray source 30 may be located on a left side of the first ray source 10, and the third ray source 30 is located on a left side of the second ray source 20. The movement trajectory of the bearing platform 100 passes between the first ray source 10 and the first detector 11, between the second ray source 20 and the second detector 21, and between the third ray source 30 and the third detector 31.

Figure 7:
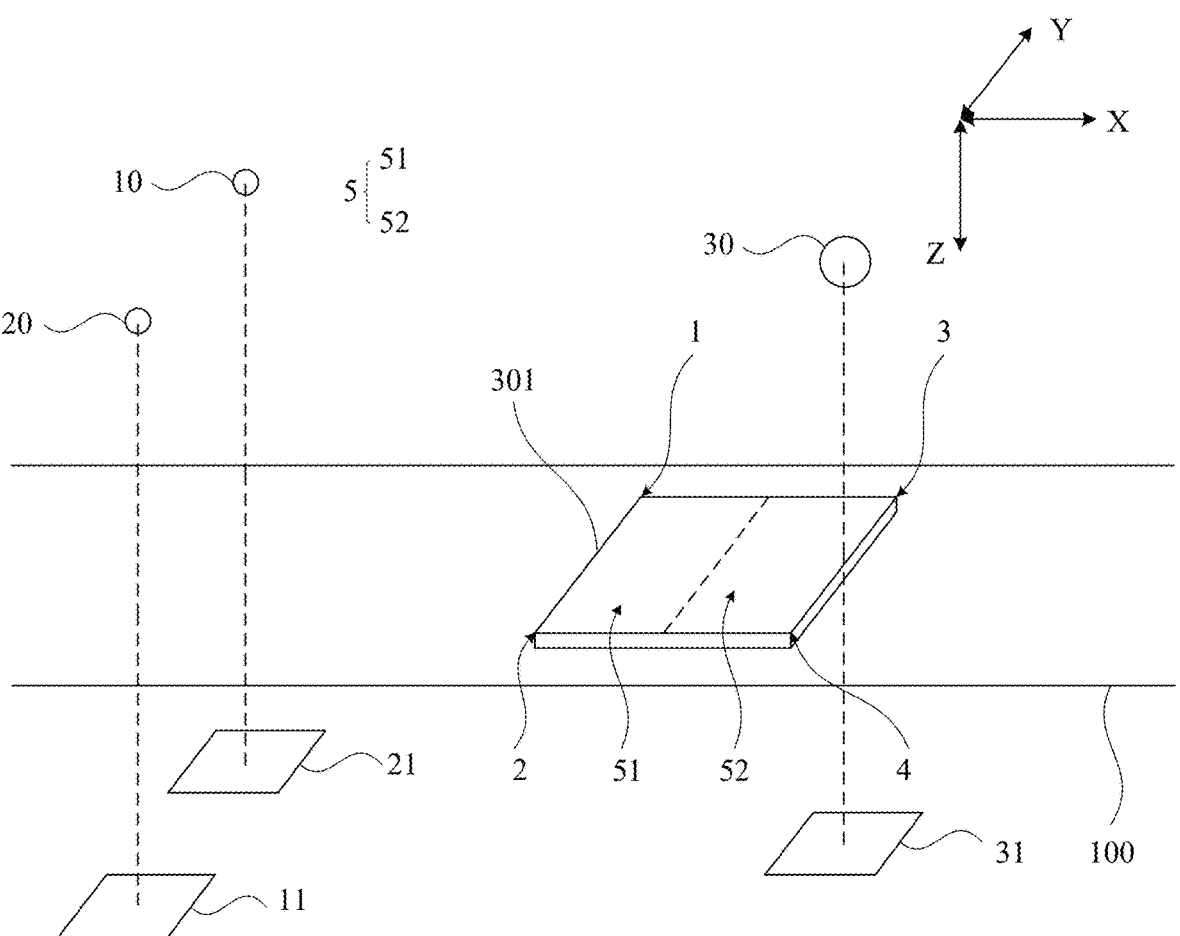
FIG. 7 is a schematic structural diagram of a testing apparatus according to some other embodiments of the present application.
Figure 8:
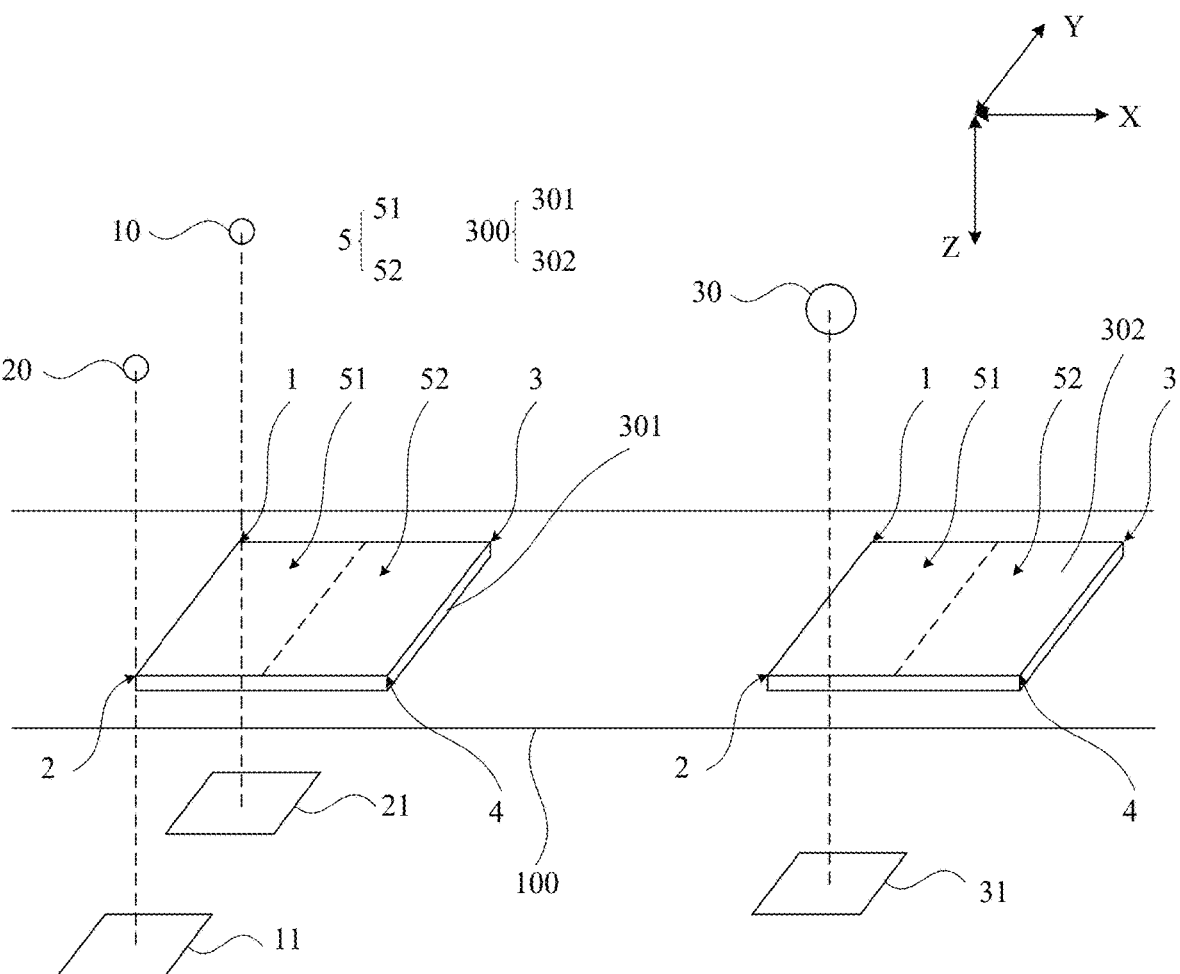
FIG. 8 is a schematic structural diagram of a testing apparatus according to some other embodiments of the present application.
Figures 9, 10:
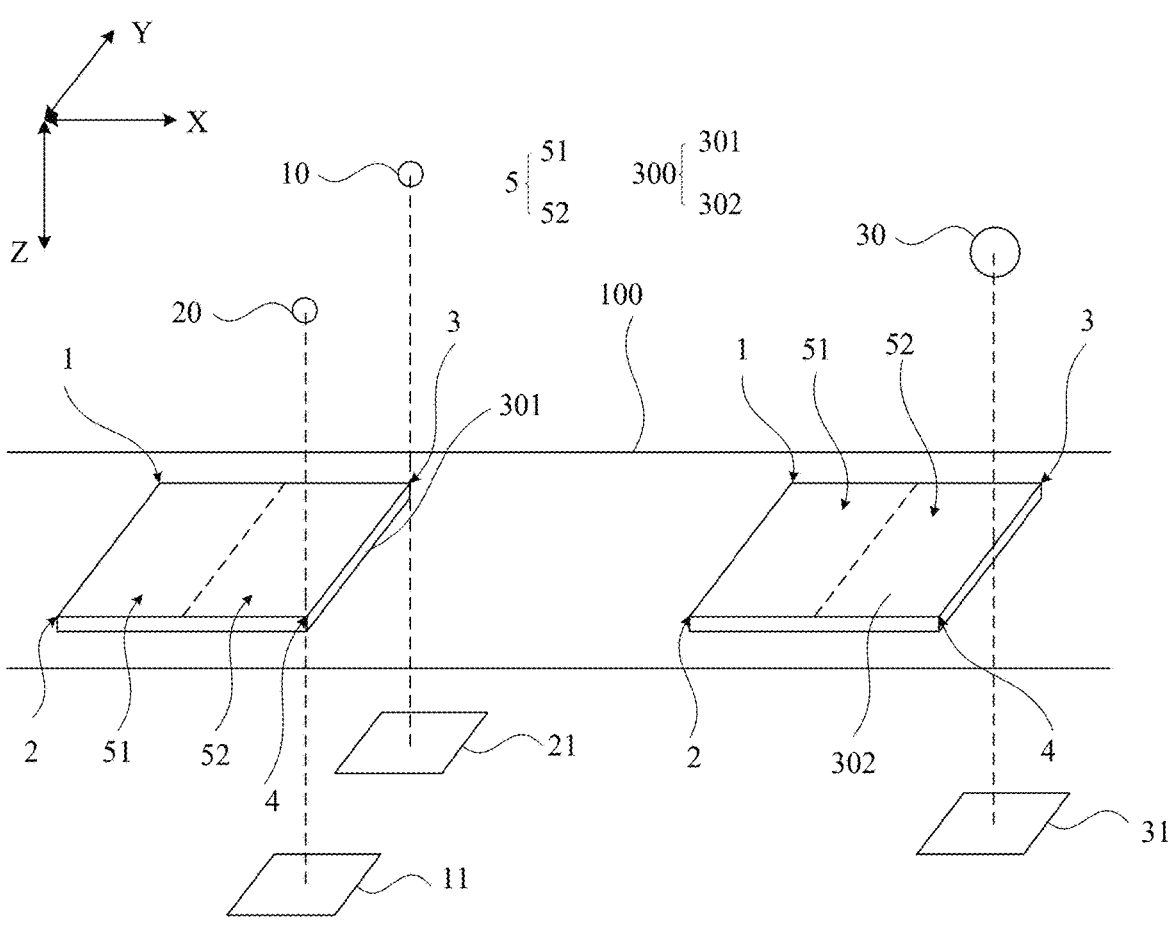
FIG. 9 is a schematic structural diagram of a testing apparatus according to some other embodiments of the present application.
FIG. 10 is a flowchart of a battery testing method according to some embodiments of the present application.

The positional relationship of the testing apparatus shown in FIG. 6 to FIG. 9 is used for explanation. The battery 300 to be tested includes a first battery 301 to be tested and a second battery 302 to be tested. In a moving direction of the battery 300 to be tested, the second battery 302 to be tested is located at a downstream of the first battery 301 to be tested. During testing, first, referring to FIG. 6, the third ray source 30 and the third detector 31 test the first region 51 of the first surface 5 of the first battery 301 to be tested. Then, the bearing platform 100 is controlled to move in the first direction X. Referring to FIG. 7, the third ray source 30 and the third detector 31 test the second region 52 of the first surface 5 of the first battery 301 to be tested. Then, the bearing platform 100 is controlled to move in the first direction X. Referring to FIG. 8, the first ray source 10 and the first detector 11 test the first corner 1 of the first battery 301 to be tested, and the second ray source 20 and the second detector 21 test the second corner 2 of the first battery 301 to be tested. In this case, the first region 51 of the first surface 5 of the second battery 302 to be tested is moved to a position between the third ray source 30 and the third detector 31, and the third ray source 30 and the third detector 31 test the first region 51 of the first surface 5 of the second battery 302 to be tested. Then, the bearing platform 100 is controlled to move in the first direction X again. Referring to FIG. 9, the first ray source 10 and the first detector 11 test the third corner 3 of the first battery 301 to be tested, and the second ray source 20 and the second detector 21 test the fourth corner 4 of the first battery 301 to be tested. The third ray source 30 and the third detector 31 test the second region 52 of the first surface 5 of the second battery 302 to be tested. Then, the bearing platform 100 is controlled to move in the first direction X again to test the corners of the second battery 302 to be tested. This cycle is repeated to test a plurality of batteries 300 to be tested.

It should be noted that in the explanation of the above steps, an example in which the first surface 5 of the battery 300 to be tested is tested first and then the corners of the battery 300 to be tested are tested is used for explanation. In other implementations, the corners of the battery 300 to be tested may be tested first, and then the first surface 5 of the battery 300 to be tested may be tested. In the testing process of FIGS. 6 to 9, the bearing platform 100 may be controlled to move rightwards in the first direction X.

In this embodiment of the present application, when the first ray source 10 and the first detector 11 test the first corner 1 of the battery 300 to be tested, a connection line between a center of the ray source focus of the first ray source 10 and the first corner 1 should be perpendicular to the first surface 5, to reduce impact of distortions on a testing result. Similarly, when the second ray source 20 and the second detector 21 test the second corner 2 of the battery 300 to be tested, a connection line between a center of the ray source focus of the second ray source 20 and a center of the second corner 2 should be perpendicular to the first surface 5. When the first ray source 10 and the first detector 11 test the third corner 3 of the battery 300 to be tested, a connection line between the center of the ray source focus of the first ray source 10 and the third corner 3 should be perpendicular to the first surface 5. Similarly, when the second ray source 20 and the second detector 21 test the fourth corner 4 of the battery 300 to be tested, a connection line between the center of the ray source focus of the second ray source 20 and a center of the fourth corner 4 should be perpendicular to the first surface 5.

In this embodiment of the present application, when the third ray source 30 and the third detector 31 test the first region 51 of the first surface 5 of the battery 300 to be tested, connection lines between a center of the ray source focus of the third ray source 30 and the centers of both the first corner 1 and the second corner 2 should be perpendicular to the first surface 5, to reduce impact of distortions on a testing result. When the third ray source 30 and the third detector 31 test the second region 52 of the first surface 5 of the battery 300 to be tested, connection lines between the center of the ray source focus of the third ray source 30 and the centers of both the third corner 3 and the fourth corner 4 should be perpendicular to the first surface 5, to reduce impact of distortions on a testing result. The center line of the ray emitted by the third ray source 30 passes through the midpoint of the side on which the first corner 1 and the second corner 2 are located, or the center line of the ray emitted by the ray source 30 passes through the midpoint of the side on which the third corner 3 and the fourth corner 4 are located.

In this embodiment of the present application, the area of the radiation surface of the third ray source 30 on the first surface 5 is larger than or equal to half of the area of the first surface 5. The first surface 5 can be tested through two instances of testing, and the first surface 5 is tested more comprehensively in the two instances of testing. For example, in the first instance of testing, the third ray source 30 and the third detector 31 are opposite to a left portion of the first surface 5, and the left portion of the first surface 5 is tested. Then, the battery 300 to be tested is moved or the third ray source 30 and the third detector 31 are moved, so that the third ray source 30 and the third detector 31 are opposite to a right portion of the first surface 5, and the right portion of the first surface 5 is tested. By controlling the positions of the first surface 5, the third ray source 30, and the third detector 31, a union of the radiation surface of the third ray source 30 on the first surface 5 in the two instances of testing can completely cover the first surface, making the testing more comprehensive.

According to some embodiments of the present application, referring to FIG. 3, the first ray source 10, the second ray source 20, and the third ray source 30 are all located on the same side of the bearing platform 100.

In this embodiment of the present application, the first ray source 10, the second ray source 20, and the third ray source 30 may be located on the same side of the bearing platform 100 as the battery 300 to be tested.

In this embodiment of the present application, the first ray source 10, the second ray source 20, and the third ray source 30 are all placed on the same side of the bearing platform 100, and the first detector 11, the second detector 21 and the third detector 31 are all placed on another side of the bearing platform 100, for ease of arrangement.

In some embodiments of the present application, at least one of the first ray source 10, the second ray source 20, and the third ray source 30 is an integrated ray source.

Exemplarily, one of the first ray source 10, the second ray source 20, and the third ray source 30 may be an integrated ray source; or two of the first ray source 10, the second ray source 20, and the third ray source 30 may be integrated ray sources; or the first ray source 10, the second ray source 20, and the third ray source 30 may all be integrated ray sources.

Exemplarily, the first ray source 10, the second ray source 20, and the third ray source 30 may all be closed integrated X-ray tubes.

An integrated ray source has a low rework rate, high stability, a small size, and simple later maintenance. The first ray source 10, the second ray source 20, or the third ray source 30 is set as the integrated ray source to improve reliability of the testing apparatus.

An embodiment of the present application provides a battery testing method. The testing method uses the testing apparatus in the above embodiments to test a battery 300 to be tested. The battery 300 to be tested includes a first corner 1 and a second corner 2. FIG. 10 is a flowchart of a battery testing method according to some embodiments of the present application. Referring to FIG. 10, the testing method includes:

Step S101: Obtain a testing image of a battery to be tested. The testing image includes a first corner testing image and a second corner testing image.

Step S102: Determine defect information of the battery to be tested based on the testing image.

Step S103: Determine a quality testing result of the battery to be tested based on the defect information of the battery to be tested.

In this embodiment of the present application, the first corner testing image of the battery 300 to be tested may be obtained by testing the first corner 1 of the battery 300 to be tested through cooperation between the first ray source 10 and the first detector 11, and the second corner testing image of the battery 300 to be tested may be obtained by testing the second corner 2 of the battery 300 to be tested through cooperation between the second ray source 20 and the second detector 21.

In this embodiment of the present application, the defect information of the battery 300 to be tested includes morphological defects such as wrinkles and breakage of electrode plates.

In this embodiment of the present application, the quality testing result of the battery 300 to be tested is configured to indicate whether the battery 300 to be tested is qualified.

In this embodiment of the present application, if an electrode plate close to the first corner 1 or the second corner 2 of the battery 300 to be tested is wrinkled or broken, a grayscale change may appear in the first corner testing image or the second corner testing image, and the defect information of the battery 300 to be tested may be determined according to the grayscale change in the first corner testing image or the second corner testing image.

In this embodiment of the present application, the detector may be calibrated before testing begins, to reduce an error in a testing image. Exemplarily, a detector needs to be calibrated before formal operation. Before the calibration, it is necessary to ensure that there is no debris at the exit ports of the ray sources and on the surfaces of the detectors, and there is no obstruction between the ray sources and the detectors. The rays are required to fully cover receiving surfaces of the detectors. A grayscale value of imaging of the testing apparatus at this time may be adjusted to a calibration grayscale value.

In this embodiment of the present application, the first corner testing image and the second corner testing image of the battery 300 to be tested are obtained, and the defect information of the battery 300 to be tested is determined by analyzing the first corner testing image and the second corner testing image, so that distortions in the first corner testing image and the second corner testing image can be reduced, making the first corner testing image closer to an actual situation of the first corner 1 of the battery 300 to be tested and making the second corner testing image closer to an actual situation of the second corner 2 of the battery 300 to be tested. Therefore, the defect testing on the inside of the battery 300 to be tested is more comprehensive, and problems of misjudgment, omissions, and incompletion of the defect testing are reduced.

According to some embodiments of the present application, FIG. 11 is a flowchart of step S101 according to some embodiments of the present application. Referring to FIG. 11, step S101 includes:

Step S111: Control the first corner to be located between the first ray source and the first detector, and controlling the second corner to be located between the second ray source and the second detector.

Step S112: Control a ray emitted by the first ray source to be projected to the first detector through the first corner of the battery to be tested.

Step S113: Control a ray emitted by the second ray source to be projected to the second detector through the second corner of the battery to be tested.

Step S114: Determine the first corner testing image based on the ray received by the first detector.

Step S115: Determine the second corner testing image based on the ray received by the second detector.

Step S116: Determine the testing image of the battery to be tested based on the first corner testing image and the second corner testing image.

In this embodiment of the present application, in the testing process, the battery 300 to be tested can be controlled to move, and the first ray source 10, the second ray source 20, the first detector 11, and the second detector 21 can also be controlled to move, so that the first corner 1 is located between the first ray source 10 and the first detector 11, and the second corner 2 is located between the second ray source 20 and the second detector 21.

In this embodiment of the present application, the battery 300 to be tested can be moved by controlling the movement of the bearing platform 100.

In this embodiment of the present application, the battery 300 to be tested can be grasped onto the bearing platform 100 through a manipulator, and the bearing platform 100 moves the battery 300 to be tested to a testing station. In the process that the manipulator grasps the battery 300 to be tested, accuracy of a grasping position needs to be ensured, to ensure subsequent imaging quality and provide more accurate original information for later treatment.

In this embodiment of the present application, a soft device may be arranged at a grasping and clamping position of the manipulator, to reduce damage to the battery 300 to be tested during the grasping. A limiting block may be arranged on the bearing platform 100 to improve stability of the battery 300 to be tested in an entire mechanical movement process.

In this embodiment of the present application, step S112 and step S113 may be performed simultaneously or separately. Step S112 may be performed before step S113 or after step S113. Similarly, step S114 and step S115 may be performed simultaneously or separately. Step S114 may be performed before step S115 or after step S115.

In this embodiment of the present application, step S113 and step S114 may not have a sequential order. Step S114 and step S113 may be simultaneously performed, or step S114 may be performed before step S113 or after step S113. However, it needs to ensure that step S114 is after step S112.

Similarly, step S112 and step S115 do not have a sequential order, either. Step S115 and step S112 may be simultaneously performed, or step S115 may be performed before step S112 or after step S112. However, it needs to ensure that step S115 is after step S113.

In this embodiment of the present application, by controlling the first corner 1 to be located between the first ray source 10 and the first detector 11 and controlling the second corner 2 to be located between the second ray source 20 and the second detector 21, during defect testing on the battery 300 to be tested, an angle between a ray and a surface on which the first corner 1 and the second corner 2 of the battery 300 to be tested are located is as close to 90° as possible, thereby reducing distortions in the first corner testing image and the second corner testing image, making the first corner testing image closer to an actual situation of the first corner 1 of the battery 300 to be tested closer, and making the second corner testing image closer to an actual situation of the second corner 2 of the battery 300 to be tested closer. The defect testing is performed on the corners of the battery 300 to be tested through the first corner testing image and the second corner testing image, so that the defect testing on the inside of the battery 300 to be tested is more comprehensive, and problems of misjudgment, omissions, and incompletion of the defect testing are reduced.

According to some embodiments of the present application, FIG. 12 is a flowchart of step S114 according to some embodiments of the present application. Referring to FIG. 12, step S114 includes:

Step S1141: Acquire, based on the ray received by the first detector, a plurality of first original images that include the first corner.

Step S1142: Process the plurality of first original images to obtain the first corner testing image.

In this embodiment of the present application, the first original images are unprocessed images. In this case, the first corner 1 or the second corner 2 of the battery 300 to be tested in the images is not clear enough. After the plurality of first original images are processed, the first corner 1 or the second corner 2 in the images are clearer, and it is easier to recognize a defect of the battery 300 to be tested.

If only one original image is acquired, which has an error, the first corner testing image obtained subsequently will also have an error. This affects accuracy of testing. In this embodiment of the present application, the plurality of first original images are acquired and processed. If an error occurs in one of the first original images, and the remaining first original images are still correct, impact of the error on a testing result can be reduced.

In this embodiment of the present application, if the battery 300 to be tested, the first ray source 10, and the first detector 11 are all fixed during the acquisition, differences between the plurality of first original images are small.

Figure 13:
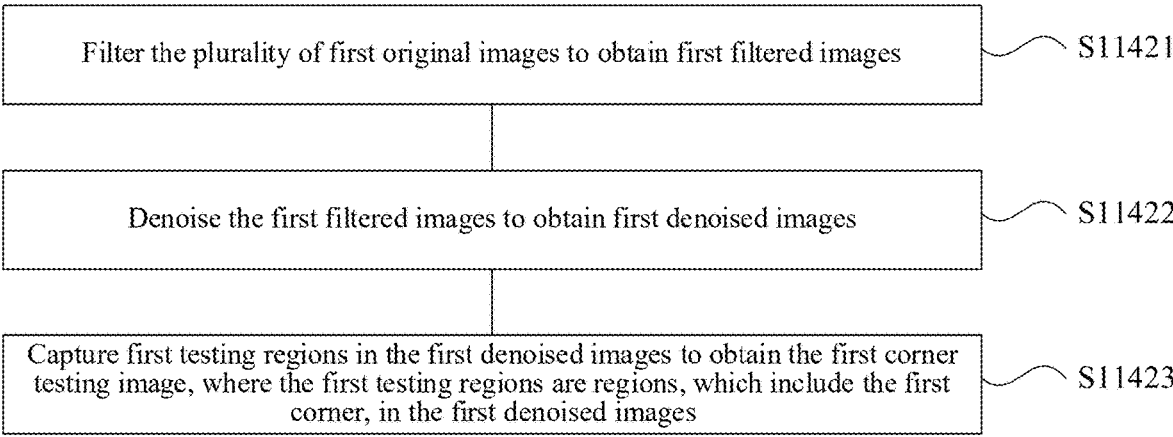
FIG. 13 is a flowchart of step S1142 according to some embodiments of the present application.

According to some embodiments of the present application, FIG. 13 is a flowchart of step S1142 according to some embodiments of the present application. Referring to FIG. 13, step S1142 includes:

Step S11421: Filter the plurality of first original images to obtain first filtered images.

Step S11422: Denoise the first filtered images to obtain first denoised images.

Step S11423: Capture first testing regions in the first denoised images to obtain the first corner testing image, where the first testing regions are regions, which include the first corner, in the first denoised images.

In this embodiment of the present application, the filtering may include average filtering, Gaussian filtering, and the like. Irrelevant information in the plurality of first original images can be removed, and a signal-to-noise ratio of the first original images can be improved.

In this embodiment of the present application, the first denoised images are obtained by denoising the first filtered images, so that random noises such as quantum noise, aliasing noise, and electronic noise in the first filtered image can be removed, thereby greatly improving the signal-to-noise ratio of the first filtered images.

The first original images acquired by the first ray source 10 and the first detector 11 include the first corner and other regions. In this embodiment of the present application, regions with the first corner 1 are captured. Subsequent calculations can be reduced, and impact of errors in other regions on defect testing of the first corner 1 can also be reduced.

In this embodiment of the present application, the plurality of first original images are processed through the above steps to obtain the first corner testing image. A similar method may be used to control the second detector to acquire a plurality of second original images that include the second corner, and perform the above processing on the plurality of second original images to obtain the second corner testing image.

Figure 14:
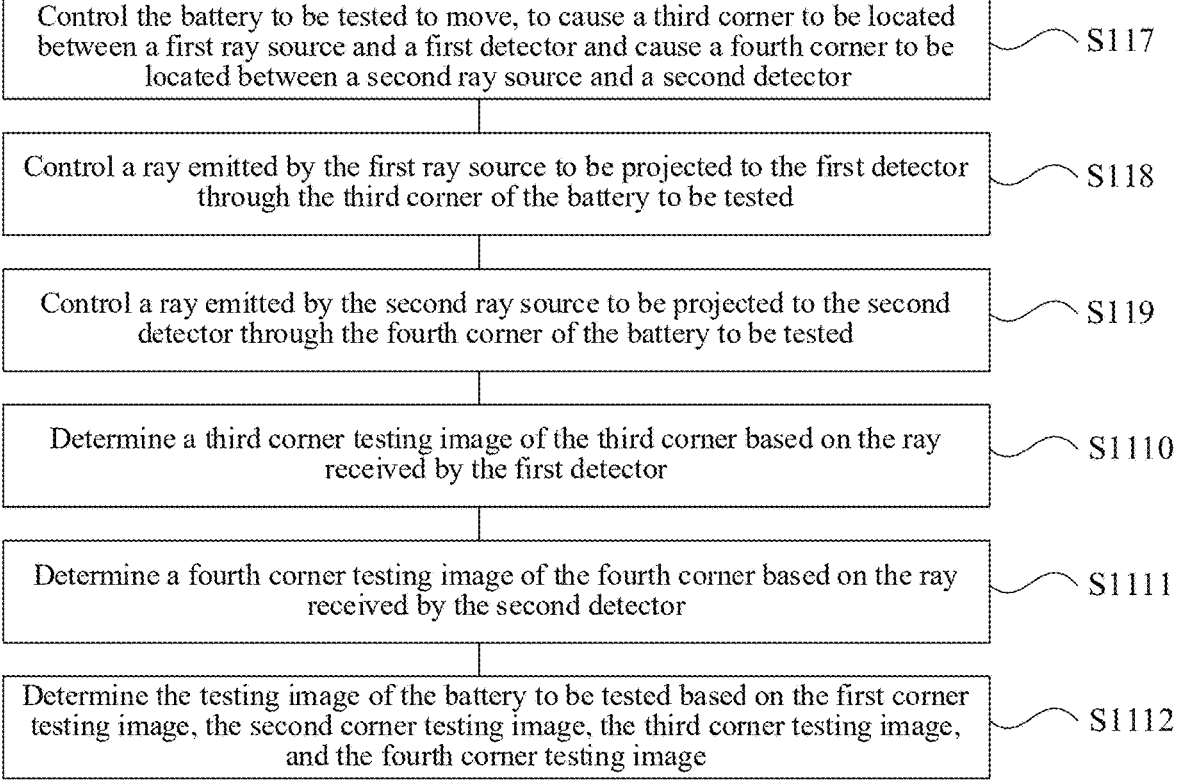
FIG. 14 is a flowchart of step S101 according to some other embodiments of the present application.

According to some embodiments of the present application, the first corner 1 is adjacent to the second corner 2. The battery 300 to be tested further includes a third corner 3 and a fourth corner 4 that are adjacent. The third corner 3 is adjacent to the first corner 1, and the fourth corner 4 is adjacent to the second corner 2. FIG. 14 is a flowchart of step S101 according to some other embodiments of the present application. Referring to FIG. 14, step S101 further includes:

Step S117: Control the battery to be tested to move, to cause the third corner to be located between the first ray source and the first detector and cause the fourth corner to be located between the second ray source and the second detector.

Step S118: Control a ray emitted by the first ray source to be projected to the first detector through the third corner of the battery to be tested.

Step S119: Control a ray emitted by the second ray source to be projected to the second detector through the fourth corner of the battery to be tested.

Step S1110: Determine a third corner testing image of the third corner based on the ray received by the first detector.

Step S1111: Determine a fourth corner testing image of the fourth corner based on the ray received by the second detector.

Step S1112: Determine the testing image of the battery to be tested based on the first corner testing image, the second corner testing image, the third corner testing image, and the fourth corner testing image.

In this embodiment of the present application, the battery 300 to be tested can be moved by controlling the movement of the bearing platform 100.

In this embodiment of the present application, step S118 and step S119 may be performed simultaneously or separately. Step S118 may be performed before step S119 or after step S119. Similarly, step S1110 and step S1111 may be performed simultaneously or separately. Step S1110 may be performed before step S1111 or after step S1111.

In this embodiment of the present application, step S119 and step S1110 may not have a sequential order. Step S1110 and step S119 may be simultaneously performed, or step S1110 may be performed before step S119 or after step S119. However, it needs to ensure that step S1110 is after step S118.

Similarly, step S118 and step S1111 do not have a sequential order, either. Step S1111 and step S118 may be simultaneously performed, or step S1111 may be performed before step S118 or after step S118. However, it needs to ensure that step S1111 is after step S119.

In this embodiment of the present application, through the above steps, the third corner 3 and the fourth corner 4 of the battery 300 to be tested can also be tested, so that the battery 300 to be tested can be tested more comprehensively. Meanwhile, the third corner testing image is closer to an actual situation of the third corner 3 of the battery 300 to be tested, and the fourth corner testing image is closer to an actual situation of the fourth corner 4 of the battery 300 to be tested, thereby reducing problems of misjudgment, omissions, and incompletion of the defect testing.

According to some embodiments of the present application, the battery 300 to be tested is located on the bearing platform 100. The third corner 3 and the first corner 1 are arranged in a first direction X, and the fourth corner 4 and the second corner 2 are arranged in the first direction X. Step S117 includes:

Step S1171: Control the bearing platform to move in the first direction, to cause the third corner to be located between the first ray source and the first detector and cause the fourth corner to be located between the second ray source and the second detector.

In this embodiment of the present application, the first direction X is parallel to one side edge of the first surface 5. Since the battery 300 to be tested is a rectangular parallelepiped, a distance between the third corner 3 and the first corner 1 is equal to a distance between the fourth corner 4 and the second corner 2.

Exemplarily, a distance that the bearing platform 100 is moved in the first direction X is equal to the distance between the third corner 3 and the first corner 1.

In this embodiment of the present application, compared with controlling the battery 300 to be tested to move, controlling the bearing platform 100 to move is simpler and does not need to change a positional relationship between the battery 300 to be tested and the bearing platform 100, so that the battery 300 to be tested is more stable.

According to some embodiments of the present application, the battery 300 to be tested further includes a first surface 5. The first surface 5 is perpendicular to a thickness direction Z of the battery 300 to be tested. The first corner 1 and the second corner 2 are both located on the first surface 5. FIG. 15 is a flowchart of step S101 according to some other embodiments of the present application. Referring to FIG. 15, step S101 further includes:

Step S1113: Control the first surface to be located between the third ray source and the third detector.

Step S1114: Control a ray emitted by the third ray source to be projected to the third detector through the first surface of the battery to be tested.

Step S1115: Determine a first surface testing image of the first surface based on the ray received by the third detector.

Step S1116: Determine the testing image of the battery to be tested based on the first corner testing image, the second corner testing image, the third corner testing image, the fourth corner testing image, and the first surface testing image.

In this embodiment of the present application, there is no strict order requirement for the testing on the first surface 5 of the battery 300 to be tested and the testing on the corners of the battery 300 to be tested, and the testing may be simultaneously or separately performed. For the relevant steps, refer to the explanations of the above testing apparatus in FIG. 3 to FIG. 9.

In this embodiment of the present application, the above steps further include testing the first surface 5 of the battery 300 to be tested, so that the battery 300 to be tested is tested more comprehensively.

According to some embodiments of the present application, the first surface 5 includes a first region 51 and a second region 52 that are connected to each other. FIG. 16 is a flowchart of step S1114 according to some embodiments of the present application. Referring to FIG. 16, step S1114 includes:

Step S11141: Control the ray emitted by the third ray source to be projected to the third detector at least through the first region.

Step S11142: Control the ray emitted by the third ray source to be projected to the third detector at least through the second region.

In this embodiment of the present application, by controlling the battery 300 to be tested to move, the third ray source 30 can be controlled to be opposite to the first region 51 and the second region 52 during the testing on both sides.

In this embodiment of the present application, a first region testing image and a second region testing image can be respectively determined based on the ray received by the third detector; and then the first surface testing image of the first surface can be determined based on the first region testing image and the second region testing image.

In this embodiment of the present application, through the two instances of testing on the first surface 5, omissions of the testing on the first surface 5 can be reduced, thereby making the defect testing on the battery 300 to be tested more comprehensive.

According to some embodiments of the present application, FIG. 17 is a flowchart of step S102 according to some embodiments of the present application. Referring to FIG. 17, step S102 includes:

Step S121: Determine a defect quantity and/or a defect size of the battery to be tested based on the testing image.

Step S122: Determine the defect information of the battery to be tested based on the defect quantity and/or the defect size.

In this embodiment of the present application, the defect quantity and the defect size are both standards for measuring defects in the battery 300 to be tested. The defect quantity is a sum of quantities of all defects in the battery 300 to be tested, and the defect size is a size of each individual defect.

According to some embodiments of the present application, step S103 includes:

Step S131: In response to the defect quantity being greater than a preset quantity, determine that the battery to be tested is disqualified.

In this embodiment of the present application, when the defect quantity is greater than the preset quantity, it indicates that there are many defects in the battery 300 to be tested, and the battery 300 to be tested is determined to be disqualified.

According to some embodiments of the present application, step S103 includes:

Step S132: In response to the defect size being greater than a preset size, determine that the battery to be tested is disqualified.

In this embodiment of the present application, when the defect size is greater than the preset quantity, it indicates that the defect size in the battery 300 to be tested is large, and the battery 300 to be tested is determined to be disqualified.

According to some embodiments of the present application, step S103 further includes:

Step S133: In response to the defect quantity being less than or equal to a preset quantity and the defect size being less than or equal to a preset size, determine that the battery to be tested is qualified.

It should be noted that the above steps are explanations of the defect testing on each battery to be tested. In actual applications, an entire process of defect testing can be implemented for a plurality of batteries to be tested. For the defect testing on the plurality of batteries to be tested, refer to the explanations of the above testing apparatus in FIG. 6 to FIG. 9, and the present application will not elaborate it here.

In this embodiment of the present application, validity of the testing apparatus is calibrated before testing begins, and defect samples to be tested with various sizes and types are defined according to testing requirements, so as to make an experimental battery. The experimental battery is tested before testing. If defects on the experimental battery can all be determined by an algorithm and the experimental battery can marked as a no good (NG) product and discarded, it proves that the testing apparatus is valid. If any defect on the experimental battery cannot be determined by the algorithm and the experimental battery is marked as an NG product and discarded, testing performed by the apparatus needs to be suspended until the algorithm is debugged to determine all the defects are NG.

In this embodiment of the present application, before testing begins, particular calibration and recognition can be performed on a defective testing image, and a defect can be automatically recognized and determined through an artificial intelligence (AI) algorithm.

In this embodiment of the present application, each testing process may be fed back to the AI algorithm, and the AI algorithm may continuously optimize the recognition and determination of a defect according to each testing process, thereby improving accuracy of defect recognition.

Exemplarily, after a defect is recognized, the defect may be marked to facilitate working staff to observe the defect.

An embodiment of the present application provides a battery testing apparatus. A battery to be tested includes a first corner and a second corner. The battery testing apparatus includes: an obtaining module, configured to obtain a testing image of the battery to be tested, where the testing image includes a first corner testing image and a second corner testing image; a first determining module, configured to determine defect information of the battery to be tested based on the testing image; and a second determining module, configured to determine quality testing result of the battery to be tested based on the defect information of the battery to be tested.

In some embodiments of the present application, the obtaining module includes: a first control submodule, configured to: control the first corner to be located between the first ray source and the first detector, and control the second corner to be located between the second ray source and the second detector; a second control submodule, configured to control a ray emitted by the first ray source to be projected to the first detector through the first corner of the battery to be tested; a third control submodule, configured to control a ray emitted by the second ray source to be projected to the second detector through the second corner of the battery to be tested; a first determining submodule, configured to determine the first corner testing image based on the ray received by the first detector; a second determining submodule, configured to determine the second corner testing image based on the ray received by the second detector; and a third determining submodule, configured to determine the testing image of the battery to be tested based on the first corner testing image and the second corner testing image.

In some embodiments of the present application, the first determining submodule includes: an acquisition unit, configured to acquire, based on the ray received by the first detector, a plurality of first original images that include the first corner; and a processing unit, configured to process the plurality of first original images to obtain the first corner testing image.

In some embodiments of the present application, the processing unit includes: a filtering subunit, configured to filter the plurality of first original images to obtain first filtered images; a denoising subunit, configured to denoise the first filtered images to obtain first denoised images; and a capturing subunit, configured to capture first testing regions in the first denoised images to obtain the first corner testing image, where the first testing regions are regions, which include the first corner, in the first denoised images.

In some embodiments of the present application, the first corner is adjacent to the second corner. The battery to be tested further includes a third corner and a fourth corner that are adjacent to each other. The third corner is adjacent to the first corner, and the fourth corner is adjacent to the second corner. The obtaining module includes: a fourth control submodule, configured to control the battery to be tested to move, to cause the third corner to be located between the first ray source and the first detector and cause the fourth corner to be located between the second ray source and the second detector; a fifth control submodule, configured to control a ray emitted by the first ray source to be projected to the first detector through the third corner of the battery to be tested; a sixth control submodule, configured to control a ray emitted by the second ray source to be projected to the second detector through the fourth corner of the battery to be tested; a fourth determining submodule, configured to determine a third corner testing image of the third corner based on the ray received by the first detector; a fifth determining submodule, configured to determine a fourth corner testing image of the fourth corner based on the ray received by the second detector; and a sixth determining submodule, configured to determine the testing image of the battery to be tested based on the first corner testing image, the second corner testing image, the third corner testing image, and the fourth corner testing image.

In some embodiments of the present application, the battery to be tested is located on a bearing platform. The third corner and the first corner are arranged in a first direction, and the fourth corner and the second corner are arranged in the first direction. The fourth control submodule is further configured to control the bearing platform to move in the first direction, so that the third corner is located between the first ray source and the first detector, and the fourth corner is located between the second ray source and the second detector.

In some embodiments of the present application, the battery to be tested further includes a first surface. The first surface is perpendicular to a thickness direction of the battery to be tested. The first corner and the second corner are both located on the first surface. The obtaining module further includes: a seventh control submodule, configured to control the first surface to be located between the third ray source and the third detector; an eighth control submodule, configured to control a ray emitted by the third ray source to be projected to the third detector through the first surface of the battery to be tested; a seventh determining module, configured to determine a first surface testing image of the first surface based on the ray received by the third detector; and an eighth determining submodule, configured to determine the testing image of the battery to be tested based on the first corner testing image, the second corner testing image, the third corner testing image, the fourth corner testing image, and the first surface testing image.

In some embodiments of the present application, the first surface includes a first region and a second region that are connected to each other. The eighth control submodule includes: a first control unit, configured to control the ray emitted by the third ray source to be projected to the third detector at least through the first region; and a second control unit, configured to control the ray emitted by the third ray source to be projected to the third detector at least through the second region.

In some embodiments of the present application, the first determining module includes: a first determining unit, configured to determine a defect quantity and/or a defect size of the battery to be tested based on the testing image; and a second determining unit, configured to determine the defect information of the battery to be tested based on the defect quantity and/or the defect size.

In some embodiments of the present application, the second determining module includes: a third determining unit configured to determine, in response to the defect quantity being greater than a preset quantity, that the battery to be tested is disqualified.

In some embodiments of the present application, the second determining module includes: a fourth determining unit configured to determine, in response to the defect size being greater than a preset size, that the battery to be tested is disqualified.

For limitations on the battery testing apparatus, refer to the limitations on the battery testing method above. They will not be elaborated here. The modules in the battery testing apparatus may be implemented entirely or partially through software, hardware, or a combination thereof. The foregoing modules may be built in or independent of a processor of an electronic device in a form of hardware, or may be stored in a memory of the electronic device in a form of software, for the processor to invoke to execute operations corresponding to the foregoing modules.

An embodiment of the present application provides a battery production method. FIG. 18 is a flowchart of a battery production method according to some embodiments of the present application. Referring to FIG. 18, the method includes:

Step S301: Use the method in the above embodiments to test quality of a battery to be tested, to determine a quality testing result of the battery to be tested.

The battery production method according to this embodiment of the present application can determine defects of the battery 300 to be tested, and can determine the quality of the battery 300 to be tested based on the defects of the battery 300 to be tested.

According to some embodiments of the present application, referring to FIG. 18, the method further includes:

Step S302: In response to the quality testing result of the battery to be tested being disqualified, cull out a disqualified battery.

In this embodiment of the present application, the quality of the battery 300 to be tested can be determined based on the quality testing result of the battery 300 to be tested, and the disqualified battery can be culled out, so that stability of an apparatus or device using the battery can be improved.

Exemplarily, qualified batteries can be put into a next procedure.

An embodiment of the present application provides an electronic device, including: at least one processor; and a memory communicably connected with the at least one processor. The memory stores an instruction that is executable by the at least one processor; and the instruction, when executed by the at least one processor, causes the at least one processor to perform the battery testing method in the above embodiments or the battery production method in the above embodiments.

An embodiment of the present application provides a battery production device, including the electronic device in the above embodiments.

An embodiment of the present application provides a computer-readable storage medium, having a computer program stored therein. The computer program, when executed by a processor, implements the battery testing method according in the above embodiments or the battery production method in the above embodiments.

An embodiment of the present application provides a computer program product, including a computer program. The computer program, when executed by a processor, implements the battery testing method according in the above embodiments or the battery production method in the above embodiments.

An embodiment of the present application provides a testing apparatus for detecting a battery. A battery 300 to be tested is a stacked battery, and the battery 300 to be tested includes a first surface 5. The first surface 5 is perpendicular to a thickness direction Z of the battery 300 to be tested, and a first corner 1, a second corner 2, a third corner 3, and a fourth corner 4 are all located on the first surface 5, and the first corner 1 is adjacent to the second corner 2, and the first corner 1 is adjacent to the third corner 3.

The testing apparatus includes a first ray source 10, a first detector 11, a second ray source 20, a second detector 21, a third ray source 30, a third detector 31, and a bearing platform 100. The first ray source 10, the second ray source 20, and the third ray source 30 are all located on the same side of the bearing platform 100. The first ray source 10, the second ray source 20, and the third ray source 30 are all closed integrated X-ray tubes. The first detector 11, the second detector 21, and the third detector 31 are all flat panel detectors. A size D1 of a ray source focus of the first ray source 10 and a size D2 of a ray source focus of the second ray source 20 satisfy $D1 \leq 10$ μm and $D2 \leq 10$ μm, and a size D3 of a ray source focus of the third ray source 30 satisfies $10$ μm$< D3 \leq 30$ μm.

The first detector 11 is opposite to an exit port of the first ray source 10. The second detector 21 is opposite to an exit port of the second ray source 20. The third detector 31 is opposite to an exit port of the third ray source 30. The bearing platform 100 is located between the first ray source 10 and the first detector 11, between the second ray source 20 and the second detector 21, and between the third ray source 30 and the third detector 31. The bearing platform 100 is configured to place a battery to be tested. A ray emitted by the first ray source 10 is projected to the first detector 11 through the first corner 1 of the battery to be tested that is placed on the bearing platform 100, and the first detector 11 is configured to determine a first corner testing image of the first corner based on the received ray. The ray emitted by the first ray source 10 is projected to the first detector 11 through the third corner 3 of the battery to be tested that is placed on the bearing platform 100. Furthermore, the first detector 11 is configured to determine a third corner testing image of the third corner 3 based on the received ray. A ray emitted by the second ray source 20 is projected to the second detector 21 through the second corner 2 of the battery to be tested that is placed on the bearing platform 100, and the second detector 21 is configured to determine a second corner testing image of the second corner based on the received ray. The ray emitted by the second ray source 20 is projected to the second detector 21 through the fourth corner 4 of the battery to be tested that is placed on the bearing platform 100. Furthermore, the second detector 21 is configured to determine a fourth corner testing image of the fourth corner 4 based on the received ray. A ray emitted by the third ray source 30 is projected to the third detector 31 through the first surface 5 of the battery to be tested that is placed on the bearing platform 100. Furthermore, the third detector 31 is configured to determine a first surface testing image of the first surface 5 based on the received ray.

The testing apparatus further includes a testing unit 200, and the testing unit 200 is respectively connected to the first detector 11, the second detector 21, and the third detector 31. The testing unit 200 is configured to perform defect testing on the battery to be tested based on the first corner testing image, the second corner testing image, the third angular testing image, the fourth angular testing image, and the first surface testing image.

An embodiment of the present application provides a battery testing method. FIG. 19 is a flowchart of a battery testing method according to some embodiments of the present application. Referring to FIG. 19, the method includes:

Step S401: Control a ray emitted by a third ray source to be projected to a third detector through a first region of a first surface of a battery to be tested.

Step S402: Determine a first region testing image based on the ray received by a third detector.

Step S403: Control a bearing platform to move, to cause the ray emitted by the third ray source to be projected to the third detector through a second region of the first surface of the battery to be tested.

Step S404: Determine a second region testing image based on the ray received by the third detector.

Step S405: Determine a first surface testing image of the first surface based on the first region testing image and the second region testing image.

Step S406: Control the bearing platform to move, to cause a ray emitted by a first ray source to be projected to a first detector through a first corner of the battery to be tested and cause a ray emitted by a second ray source to be projected to a second detector through a second corner of the battery to be tested.

Step S407: Determine a first corner testing image based on the ray received by the first detector, and determine a second corner testing image based on the ray received by the second detector.

Step S408: Control the bearing platform to move, to cause the ray emitted by the first ray source to be projected to the first detector through a third corner of the battery to be tested and cause the ray emitted by the second ray source to be projected to the second detector through a fourth corner of the battery to be tested.

Step S409: Determine a third corner testing image based on the ray received by the first detector, and determine a fourth corner testing image based on the ray received by the second detector.

Step S410: Determine defect information of the battery to be tested based on the first surface testing image, the first corner testing image, the second corner testing image, the third corner testing image, and the fourth corner testing image.

Step S411: Determine a quality testing result of the battery to be tested based on the defect information of the battery to be tested.

It should be finally noted that: The foregoing embodiments are merely intended to describe the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to part or all technical features thereof. These modifications or replacements do not make the essence of the corresponding technical solutions depart from the scopes of the technical solutions of the various embodiments of the present application, and shall fall within the scopes of the claims and the specification of the present application. In particular, the technical features mentioned in the various embodiments can be combined in any manner as long as there is no structural conflict. The present application is not limited to the specific embodiments disclosed herein, but includes all technical solutions falling within the scope of the claims.

What is claimed is:

1. A testing apparatus for testing a battery, wherein a battery to be tested is a stacked battery, and the testing apparatus comprises:

a first ray source;

a second ray source;

a third ray source;

a first detector, opposite to an exit port of the first ray source;

a second detector, opposite to an exit port of the second ray source;

a third detector, opposite to an exit port of the third ray source;

a bearing platform, configured to place the battery to be tested, wherein the bearing platform is movable; a movement trajectory of the bearing platform passes between the first ray source and the first detector, and the movement trajectory of the bearing platform passes between the second ray source and the second detector and the movement trajectory of the bearing platform passes between the third ray source and the third detector; and a testing unit, respectively connected to the first detector and the second detector, wherein the testing unit is configured to perform defect testing on the battery to be tested based on a ray received by the first detector and a ray received by the second detector and the testing unit is further configured to perform defect testing on the battery to be tested based on a ray received by the third detector.

2. The testing apparatus according to claim 1, wherein a size D1 of a ray source focus of the first ray source and a size D2 of a ray source focus of the second ray source satisfy: D1≤10 μm and/or D2≤10 μm.

3. The testing apparatus according to claim 1, wherein a size D3 of a ray source focus of the third ray source (30) satisfies: 10 μm<D3≤30 μm and/or an area of a radiation surface of the third ray source on a first surface of the battery to be tested is larger than or equal to half of an area of the first surface, and the first surface is a surface of the battery to be tested that is opposite to the exit port of the third ray source.

4. The testing apparatus according to claim 1, wherein the first ray source, the second ray source, and the third ray source are all located on the same side of the bearing platform.

5. The testing apparatus according to claim 1, wherein at least one of the first ray source, the second ray source, and the third ray source is an integrated ray source.

6. A battery testing method, wherein the testing method uses the testing apparatus according to claim 1 to test a battery to be tested; the battery to be tested comprises a first corner and a second corner; and the testing method comprises:

obtaining a testing image of the battery to be tested, wherein the testing image comprises a first corner testing image and a second corner testing image;

determining defect information of the battery to be tested based on the testing image; and determining a quality testing result of the battery to be tested based on the defect information of the battery to be tested.

7. The method according to claim 6, wherein the obtaining a testing image of the battery to be tested comprises:

controlling the first corner to be located between the first ray source and the first detector, and controlling the second corner to be located between the second ray source and the second detector;

controlling a ray emitted by the first ray source to be projected to the first detector through the first corner of the battery to be tested;

controlling a ray emitted by the second ray source to be projected to the second detector through the second corner of the battery to be tested;

determining the first corner testing image based on the ray received by the first detector;

determining the second corner testing image based on the ray received by the second detector; and determining the testing image of the battery to be tested based on the first corner testing image and the second corner testing image; wherein the determining the first corner testing image based on the ray received by the first detector comprises:

acquiring, based on the ray received by the first detector, a plurality of first original images that comprise the first corner; and processing the plurality of first original images to obtain the first corner testing image.

8. The method according to claim 7, wherein the processing the plurality of first original images to obtain the first corner testing image comprises:

filtering the plurality of first original images to obtain first filtered images;

denoising the first filtered images to obtain first denoised images; and capturing first testing regions in the first denoised images to obtain the first corner testing image, wherein the first testing regions are regions, which comprise the first corner, in the first denoised images.

9. The method according to claim 7, wherein the first corner is adjacent to the second corner; the battery to be tested further comprises a third corner and a fourth corner that are adjacent to each other; the third corner is adjacent to the first corner, and the fourth corner is adjacent to the second corner; and the obtaining a testing image of the battery to be tested comprises:

controlling the battery to be tested to move, to cause the third corner to be located between the first ray source and the first detector and cause the fourth corner to be located between the second ray source and the second detector;

controlling a ray emitted by the first ray source to be projected to the first detector through the third corner of the battery to be tested;

controlling a ray emitted by the second ray source to be projected to the second detector through the fourth corner of the battery to be tested;

determining a third corner testing image of the third corner based on the ray received by the first detector;

determining a fourth corner testing image of the fourth corner based on the ray received by the second detector; and determining the testing image of the battery to be tested based on the first corner testing image, the second corner testing image, the third corner testing image, and the fourth corner testing image.

10. The method according to claim 9, wherein the battery to be tested is located on a bearing platform; the third corner and the first corner are arranged in a first direction; the fourth corner and the second corner are arranged in the first direction; and the controlling the battery to be tested to move, to cause the third corner to be located between the first ray source and the first detector and cause the fourth corner to be located between the second ray source and the second detector comprises:

controlling the bearing platform to move in the first direction, to cause the third corner to be located between the first ray source and the first detector and cause the fourth corner to be located between the second ray source and the second detector.

11. The method according to claim 10, wherein the battery to be tested further comprises a first surface; the first surface is perpendicular to a thickness direction of the battery to be tested; the first corner and the second corner are both located on the first surface; and the obtaining a testing image of the battery to be tested comprises:

controlling the first surface to be located between the third ray source and the third detector;

controlling a ray emitted by the third ray source to be projected to the third detector through the first surface of the battery to be tested;

determining a first surface testing image of the first surface based on the ray received by the third detector; and determining the testing image of the battery to be tested based on the first surface testing image in addition to the first corner testing image, the second corner testing image, the third corner testing image, the fourth corner testing image.

12. The method according to claim 11, wherein the first surface comprises a first region and a second region that are connected to each other; and the controlling a ray emitted by the third ray source to be projected to the third detector through the first surface of the battery to be tested comprises:

controlling the ray emitted by the third ray source to be projected to the third detector at least through the first region; and controlling the ray emitted by the third ray source to be projected to the third detector at least through the second region.

13. The method according to claim 6, wherein the determining defect information of the battery to be tested based on the testing image comprises:

determining a defect quantity and/or a defect size of the battery to be tested based on the testing image; and determining the defect information of the battery to be tested based on the defect quantity and/or the defect size; wherein the determining a quality testing result of the battery to be tested based on the defect information of the battery to be tested comprises:

in response to the defect quantity being greater than a preset quantity, determining that the battery to be tested is disqualified or wherein the determining a quality testing result of the battery to be tested based on the defect information of the battery to be tested comprises:

in response to the defect size being greater than a preset size, determining that the battery to be tested is disqualified.

14. A battery production method, comprising:

using the method according to claim 6 to test quality of the battery to be tested, to determine a quality testing result of the battery to be tested.

15. An electronic device, comprising:

at least one processor; and a memory communicably connected with the at least one processor, wherein the memory stores an instruction that is executable by the at least one processor; and the instruction, when executed by the at least one processor, causes the at least one processor to perform the battery testing method according to claim 6.

16. A battery production device, comprising the electronic device according to claim 15.

17. A non-transitory computer-readable storage medium, having a computer program stored therein, wherein the computer program, when executed by a processor, implements the battery testing method according to claim 6.

18. A computer program product, comprising a computer program, wherein the computer program, when executed by a processor, implements the battery testing method according to claim 6.

* * * * *